(12) United States Patent
Suzuki et al.

(10) Patent No.: US 8,162,708 B2
(45) Date of Patent: *Apr. 24, 2012

(54) MARINE PROPULSION SYSTEM

(75) Inventors: Takayoshi Suzuki, Shizuoka (JP);
Daisuke Nakamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 177 days.

This patent is subject to a terminal disclaimer.

(21) Appl. No.: 12/372,787

(22) Filed: Feb. 18, 2009

(65) Prior Publication Data
US 2009/0209145 A1    Aug. 20, 2009

(30) Foreign Application Priority Data
Feb. 18, 2008    (JP) ................................ 2008-036239

(51) Int. Cl.
*B60W 10/04*    (2006.01)
*B63H 21/21*    (2006.01)

(52) U.S. Cl. ......................................................... 440/86

(58) Field of Classification Search ................ 440/1, 49, 440/75, 80, 81, 84, 86, 87; 701/1, 21, 51–56
See application file for complete search history.

(56) References Cited

U.S. PATENT DOCUMENTS

| | | | |
|---|---|---|---|
| 5,711,742 A | 1/1998 | Leinonen et al. | |
| 5,888,108 A | 3/1999 | Iriono | |
| 6,582,259 B1 * | 6/2003 | Mansson et al. | 440/75 |
| 7,458,866 B2 * | 12/2008 | Nakamura et al. | 440/75 |
| 7,762,858 B2 * | 7/2010 | Suzuki et al. | 440/1 |
| 2003/0074114 A1 * | 4/2003 | Okuyama et al. | 701/21 |

FOREIGN PATENT DOCUMENTS

JP           09-263294 A      10/1997

* cited by examiner

*Primary Examiner* — Daniel Venne
(74) *Attorney, Agent, or Firm* — Keating & Bennett, LLP

(57) ABSTRACT

A marine propulsion system includes an engine, propellers arranged to be rotated by the engine, a transmission mechanism arranged to transmit a driving force of the engine to the propellers with a speed thereof shifted to at least a low speed reduction ratio and a high speed reduction ratio, a GPS sensor arranged to detect a position of a hull propelled by rotation of the propeller, and a control portion and an ECU arranged to control a shift between the speed reduction ratios of the transmission mechanism. The control portion is arranged to calculate a speed of the hull based on positional information of the hull. The control portion and the ECU are arranged to control a shift between the speed reduction ratios of the transmission mechanism based at least on the speed of the hull. This arrangement provides a marine propulsion system in which both acceleration performance and maximum speed can approach specific levels desired by an operator of the boat.

12 Claims, 15 Drawing Sheets

MARINE PROPULSION SYSTEM

BACKGROUND OF THE INVENTION

1. Field of the Invention

The present invention relates to marine propulsion systems. More specifically, the present invention relates to a marine propulsion system including an engine.

2. Description of the Related Art

Conventionally, marine propulsion units (marine propulsion system) including an engine are known in the art (for example, see JP-A-Hei 9-263294). JP-A-Hei 9-263294 discloses a marine propulsion unit including an engine and a power transmission mechanism transmitting a driving force of the engine to a propeller in a certain fixed reduction ratio. The marine propulsion unit is arranged in a manner such that the driving force of the engine is transmitted directly to the propeller through the power transmission mechanism such that the rotational speed of the propeller increases in proportion to the engine speed as the engine speed increases.

However, the marine propulsion unit (marine propulsion system) disclosed in JP-A-Hei 9-263294 has a problem in that it is difficult to improve acceleration performance at low speed when speed reduction ratios of the power transmission mechanism are set to gain a larger maximum speed. Conversely, this causes a problem in that it is difficult to gain a larger maximum speed when the speed reduction ratios of the power transmission mechanism are set to improve the acceleration performance at low speed. In other words, the marine propulsion unit disclosed in JP-A-Hei 9-263294 has a problem in that it is difficult for an operator of a boat to achieve both acceleration performance and maximum speed at levels that he/she desires.

SUMMARY OF THE INVENTION

In order to overcome the problems described above, preferred embodiments of the present invention provide a marine propulsion system in which both an acceleration performance and a maximum speed can approach levels that the operator of the boat desires.

To achieve this, a marine propulsion system in accordance with a preferred embodiment of the present invention includes an engine, a propeller arranged to be rotated by the engine, a transmission mechanism arranged to transmit a driving force of the engine to the propeller with a speed thereof shifted to at least a low speed reduction ratio and a high speed reduction ratio, a speed detection portion arranged to detect a speed of a hull propelled by rotation of the propeller, and a control portion arranged to control a shift between the speed reduction ratios of the transmission mechanism, wherein the control portion controls a shift between the speed reduction ratios of the transmission mechanism based at least on the speed of the hull.

As described above, the marine propulsion system in accordance with the above preferred embodiment includes the transmission mechanism arranged to transmit a driving force generated by the engine to the propeller with the speed shifted to at least the low speed reduction ratio and the high speed reduction ratio. The transmission mechanism is arranged such that the driving force generated by the engine is transmitted to the propeller with the speed shifted to the low speed reduction ratio. Accordingly, acceleration performance in the low speed position can be improved. Further, the transmission mechanism is arranged such that the driving force generated by the engine can be transmitted to the propeller with the speed shifted to the high speed reduction ratio. This allows a larger maximum speed to be obtained. As a result, both acceleration performance and maximum speed can achieve levels that the operator of the boat desires.

The speed detection portion detects the speed of the hull which directly and comprehensively reflects an actual state (action) of the hull including a state of the engine and influences outside of the engine (such as waves, shape and size of the hull). A shift is made based on the speed of the hull, and thereby a shift can be made at a timing more accurately corresponding to an actual hull state as opposed to a case in which the state of the hull is estimated from an engine state (engine load such as throttle opening and intake air pressure) and the like and a shift is made based on the estimated hull state.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described hereinafter with reference to the drawings.

First Preferred Embodiment

Figure 1:
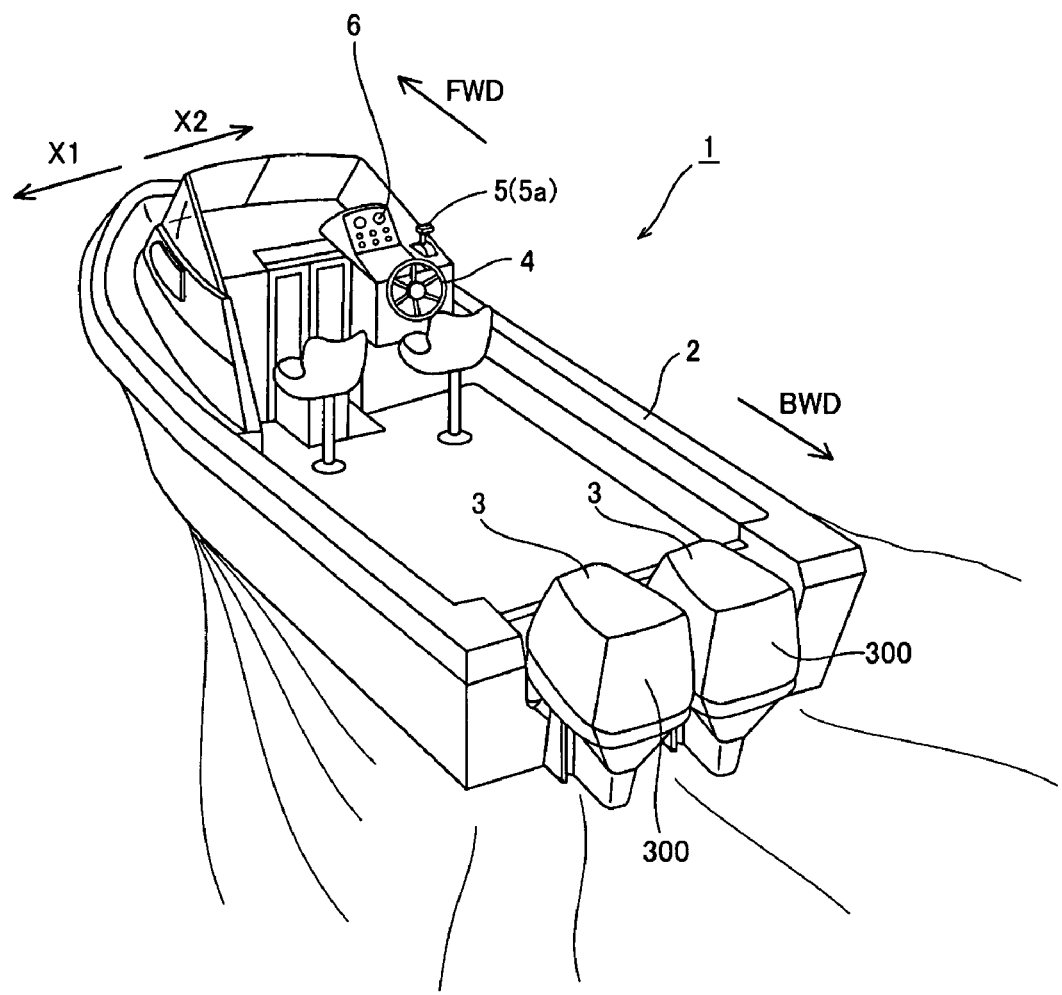
FIG. 1 is a perspective view showing a boat in which a marine propulsion system in accordance with a first preferred embodiment of the present invention is installed.
Figure 2:
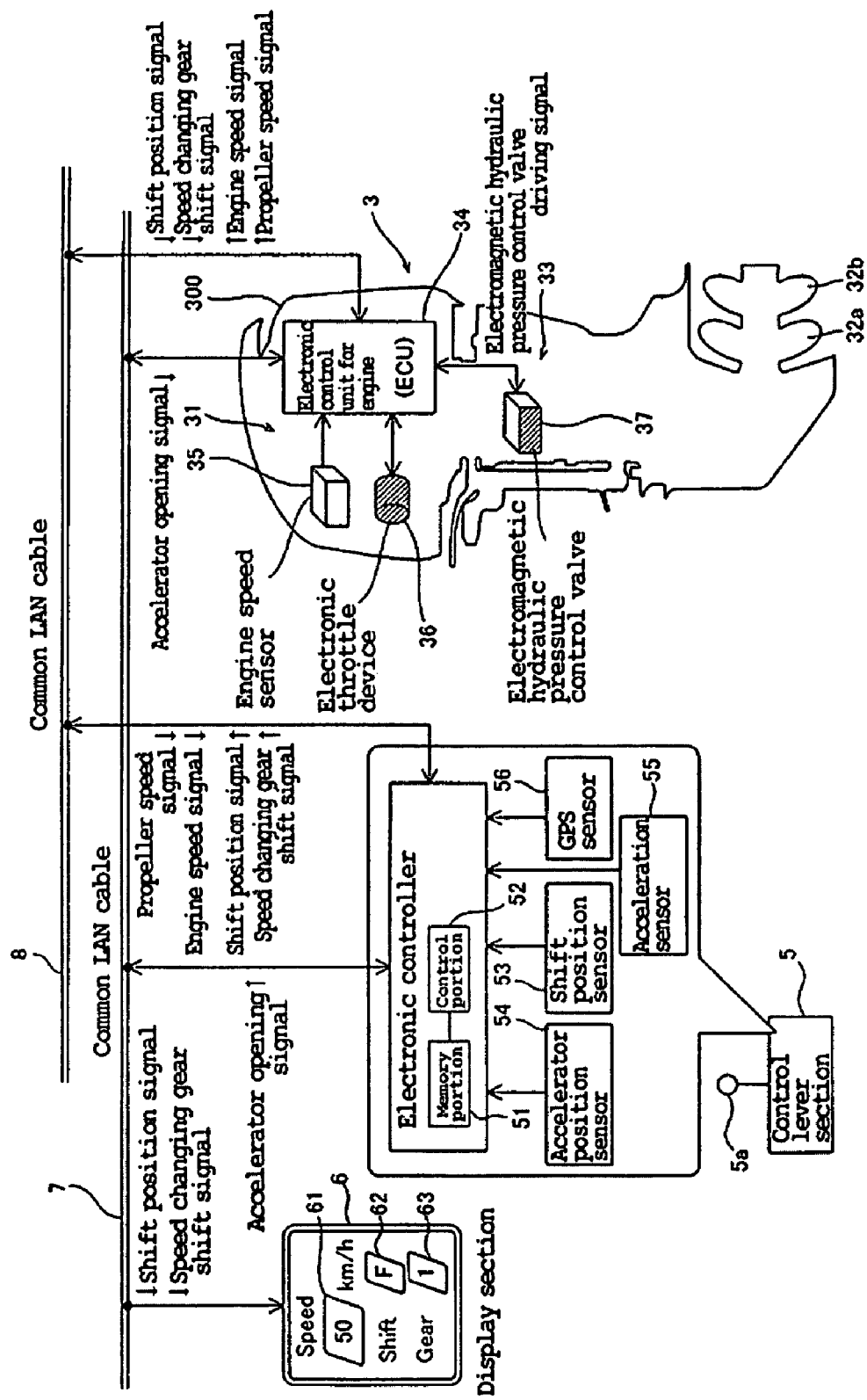
FIG. 2 is a block diagram showing a construction of the marine propulsion system in accordance with the first preferred embodiment of the present invention.

FIG. 1 is a perspective view showing a boat in which a marine propulsion system in accordance with a first preferred embodiment of the present invention is installed. FIG. 2 is a block diagram showing a construction of the marine propulsion system in accordance with the first preferred embodiment of the present invention. FIGS. 3 through 7 are drawings specifically illustrating the construction of the marine propulsion system in accordance with the first preferred embodiment shown in FIG. 1. In the figures, arrow FWD indicates the forward travel direction of the boat, and arrow BWD indicates the reverse travel direction of the boat. First, the constructions of a boat 1 and the marine propulsion system installed in the boat 1 in accordance with the first preferred embodiment will be described with reference to FIGS. 1 through 7.

As shown in FIG. 1, the boat 1 in accordance with the first preferred embodiment has a hull 2 floating on a water surface, two outboard motors 3, for example, mounted on a rear portion of the hull 2 and arranged to propel the hull 2, a steering section 4 arranged to steer the hull 2, a control lever section 5 preferably disposed in a vicinity of the steering section 4 and including a lever 5a capable of turning in the fore-and-aft direction, and a display section 6 disposed in a vicinity of the control lever section 5. As shown in FIG. 2, the outboard motors 3, the control lever section 5, and the display section 6 are connected together by common LAN cables 7 and 8, respectively. The marine propulsion system preferably includes the outboard motors 3, the steering section 4, the control lever section 5, the display section 6, and the common LAN cables 7 and 8.

As shown in FIG. 1, the two outboard motors 3 are preferably symmetrically disposed with respect to the center in the width direction (directions of arrows X1 and X2) of the hull 2. The outboard motor 3 is covered by a casing 300. The casing 300 is formed of resin or plastic and has a function to protect the inside of the outboard motor 3 from water and so forth. The outboard motor 3 includes an engine 31, two propellers 32a and 32b (see FIG. 4) arranged to convert a driving force of the engine 31 into a propulsion force of the boat 1, a transmission mechanism 33 arranged to transmit the driving force generated by the engine 31 to the propellers 32a and 32b with a speed thereof shifted to a low speed reduction ratio (approx. 1.33:1.00) and a high speed reduction ratio (approx. 1.0:1.0), and an ECU (electronic control unit) 34 arranged to electrically control the engine 31 and the transmission mechanism 33. The ECU 34 is an example of a "control portion" of the present invention. An engine speed sensor 35 arranged to detect the engine speed of the engine 31, a propeller speed sensor 38 (see FIG. 4) arranged to detect the propeller speeds of the propellers 32a and 32b, and an electronic throttle device 36 arranged to control the throttle opening of a throttle valve (not shown) of the engine 31 based on an accelerator opening signal (described below) are connected to the ECU 34. The engine speed sensor 35 is disposed in a vicinity of a crankshaft 301 (see FIG. 4) of the engine 31. The engine speed sensor 35 functions to detect the rotational speed of the crankshaft 301 and to transmit the detected rotational speed of the crankshaft 301 to the ECU 34. The propeller speed sensor 38 is disposed in a vicinity of a drive shaft 345 (see FIG. 4) of the engine 31. The propeller speed sensor 38 functions to detect the rotational speed of the drive shaft 345 and to transmit the detected rotational speed of the drive shaft 345 to the ECU 34. The electronic throttle device 36 controls the throttle opening of the throttle valve (not shown) of the engine 31 based on the accelerator opening signal from the ECU 34 and also has a function to transmit the throttle opening to the ECU 34 and the control portion 52 described below.

In the first preferred embodiment, the ECU 34 has a function to generate an electromagnetic hydraulic pressure control valve driving signal based on a speed changing gear shift signal and a shift position signal sent by the control portion 52 of the control lever section 5 described below. An electromagnetic hydraulic pressure control valve 37 is preferably connected to the ECU 34. The ECU 34 is arranged to send the electromagnetic hydraulic pressure control valve driving signal to the electromagnetic hydraulic pressure control valve 37. The electromagnetic hydraulic pressure control valve 37 is driven based on the electromagnetic hydraulic pressure control valve driving signal, and thereby the transmission mechanism 33 is controlled. A construction and operation of the transmission mechanism 33 will be described below in detail.

In the first preferred embodiment, the control lever section 5 preferably includes a memory portion 51 in which shift control maps (described below) are stored and the control portion 52 arranged to generate signals (for example, speed changing gear shift signal, shift position signal, and accelerator opening signal) to be sent to the ECU 34. The control lever section 5 further includes a shift position sensor 53 arranged to detect the shift position of the lever 5a, an accelerator position sensor 54 arranged to detect the opening of the lever (accelerator opening) opened or closed by operation on the lever 5a, an acceleration sensor 55 arranged to detect the acceleration of the hull 2, and a GPS sensor 56 arranged to detect the position of the hull 2. The shift position sensor 53 is provided to detect which shift position the lever 5a is positioned in among a neutral position, a position in front of the neutral position, and a position in the rear of the neutral position. The GPS sensor 56 is arranged to receive the position of the hull 2 from satellites by the Global Positioning System. The positional information obtained by the GPS sensor 56 is sent to the control portion 52. The control portion 52 is arranged to calculate the temporal change in the positional information of the hull 2 obtained from the GPS sensor 56 as the speed of the hull 2. The memory portion 51 and the control portion 52 are preferably connected together. The control portion 52 is arranged to read out the shift control map and so forth stored in the memory portion 51. The control portion 52 is connected to both the shift position sensor 53 and the accelerator position sensor 54. Thereby, the control portion 52 can obtain a detection signal (shift position signal) detected by the shift position sensor 53 and the accelerator opening signal detected by the accelerator position sensor 54. The GPS sensor 56 and the control portion 52 are examples of a "speed detection portion" of the present invention. The acceleration sensor 55 is an example of a "acceleration detection portion" of the present invention.

The control portion 52 is connected to both of the common LAN cables 7 and 8. Each of the common LAN cables 7 and 8 is connected to the ECU 34. The common LAN cables have functions to transmit a signal generated by the control portion 52 to the ECU 34 and to transmit a signal generated by the ECU 34 to the control portion 52. In other words, each of the common LAN cables 7 and 8 is capable of communication between the control portion 52 and the ECU 34. The common LAN cable 8 is electrically independent of the common LAN cable 7.

Specifically, the control portion 52 transmits the shift position signal of the lever 5a detected by the shift position sensor 53 to the display section 6 and the ECU 34 via the common LAN cable 7. The control portion 52 transmits the shift position signal not via the common LAN cable 8 but only via the common LAN cable 7. The control portion 52 transmits the accelerator opening signal detected by the accelerator position sensor 54 to the ECU 34 not via the common LAN cable 7 but only via the common LAN cable 8. The control portion 52 is arranged to receive an engine speed signal and a propeller speed signal sent from the ECU 34 via the common LAN cable 8.

In the first preferred embodiment, the control portion 52 electrically controls a shift between the speed reduction ratios of the transmission mechanism 33 based on operation of the control lever section 5 by an operator of the boat. Specifically, the control portion 52 generates the speed changing gear shift signal to control the transmission mechanism 33 so that it makes a shift based on the shift control map stored in the memory portion 51. The shift control maps will be described below in detail. The control portion 52 sends the generated speed changing gear shift signal to the ECU 34 via the common LAN cables 7 and 8.

Figure 3:
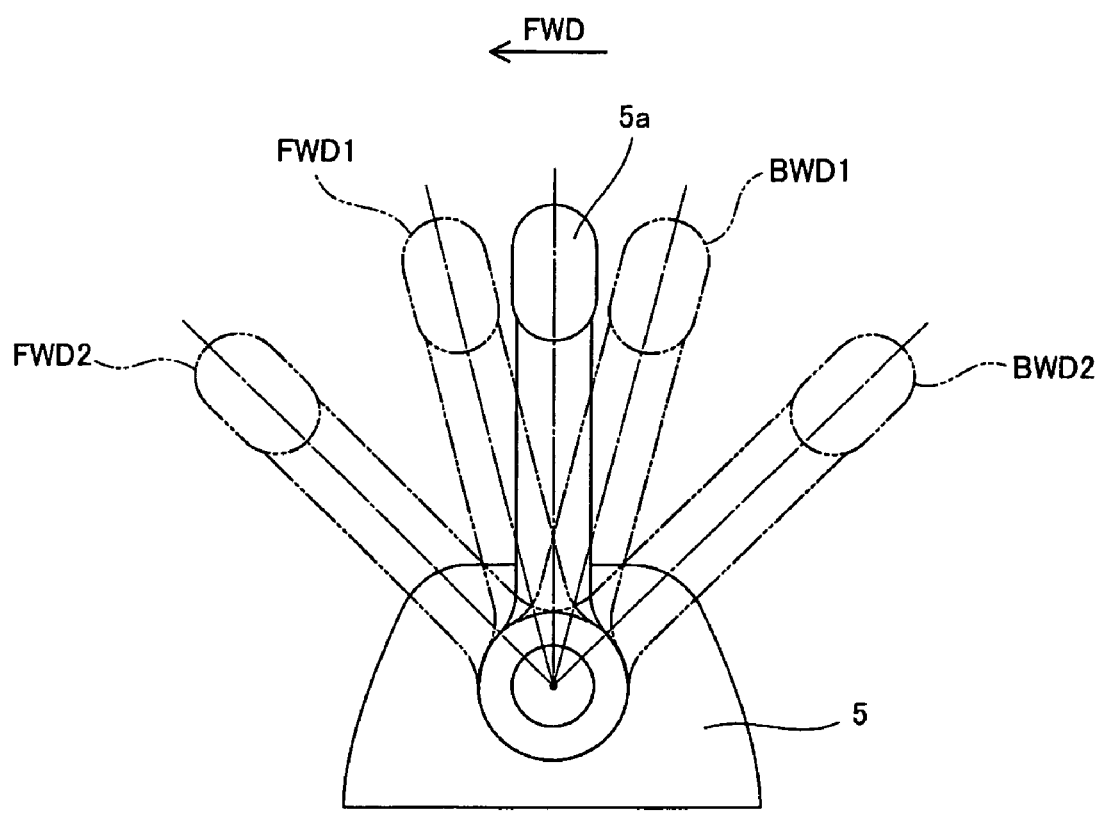
FIG. 3 is a side view illustrating a construction of a control lever section of the marine propulsion system in accordance with the first preferred embodiment shown in FIG. 1.

The transmission mechanism 33 is controlled so that the hull 2 can travel forward when the lever 5a of the control lever section 5 is turned forward (direction of arrow FWD) (see FIG. 3). The transmission mechanism 33 is controlled so that it retains a neutral state in which the hull 2 is propelled neither forward nor rearward when the lever 5a is not turned in the fore-and-aft direction as shown by the lever 5a of the control lever section 5 (see solid lines in FIG. 3). The transmission mechanism 33 is controlled so that the hull 2 can travel rearward when the lever 5a of the control lever section 5 is turned rearward (direction opposite to arrow FWD) (see FIG. 3).

The transmission mechanism 33 makes a shift-in operation (release from the neutral state) with the throttle valve (not shown) of the engine 31 fully closed (idling state) when the lever 5a of the control lever 5 is turned to position FWD1 in FIG. 3. The throttle valve (not shown) of the engine 31 fully opens when the lever 5a of the control lever section 5 is turned to position FWD2 in FIG. 3.

Similarly to the case that the lever 5a of the control lever section 5 is turned in the direction of arrow FWD, when the lever 5a is turned to position BWD1 in FIG. 3 in the direction opposite to the direction of arrow FWD, the transmission mechanism 33 makes a shift-in operation (release from the neutral state) with the throttle valve (not shown) of the engine 31 fully closed (idling state) The throttle valve (not shown) of the engine 31 fully opens when the lever 5a of the control lever 5 is turned to position BWD2 in FIG. 3.

The display section 6 preferably includes a speed display 61 indicating the traveling speed of the boat 1, a shift position display 62 indicating the shift position of the lever 5a of the control lever section 5, a gear display 63 indicating a gear in the engaged state in the transmission mechanism 33. The traveling speed (hull speed) of the boat 1 displayed on the speed display 61 is calculated by the control portion 52 based on the positional information of the hull 2 obtained by the GPS sensor 56. Calculated data about the traveling speed of the boat 1 are transmitted to the display section 6 via the common LAN cable 7. The shift position displayed on the shift position display 62 is displayed based on the shift position signal sent from the control portion 52 of the control lever section 5. The gear in the engaged state in the transmission mechanism 33 displayed on the gear display 63 is displayed based on the speed changing gear shift signal sent from the control portion 52 of the control lever section 5. In other words, the display section 6 informs the operator of the boat about the traveling state of the boat 1.

Figure 4:
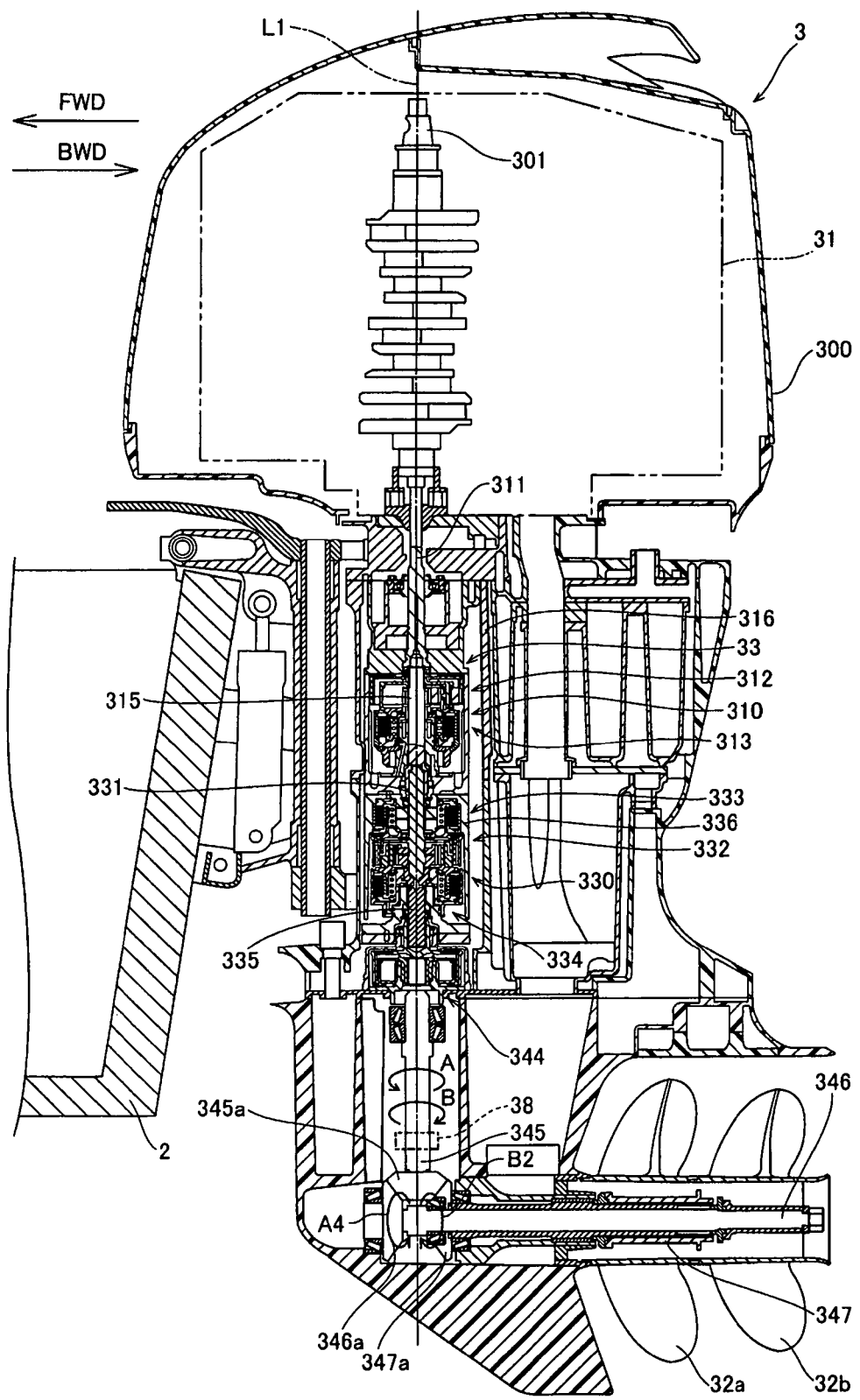
FIG. 4 is a cross-sectional view illustrating a construction of a marine propulsion system main body of the marine propulsion system in accordance with the first preferred embodiment shown in FIG. 1.

Next, arrangements of the engine 31 and the transmission mechanism 33 will be described. As shown in FIG. 4, the engine 31 has the crankshaft 301 rotating around axial line L1. The engine 31 generates a driving force through rotation of the crankshaft 301. An upper portion of an upper transmission shaft 311 of the transmission mechanism 33 is connected to the crankshaft 301. The upper transmission shaft 311 is disposed along axial line L1 and rotates around axial line L1 together with rotation of the crankshaft 301.

The transmission mechanism 33 includes the upper transmission shaft 311 described above to which the driving force of the engine 31 is input, and is arranged with an upper transmission section 310 arranged to shift so that the boat 1 can make either high speed travel or low speed travel and a lower transmission section 330 arranged to shift so that the boat 1 can make either forward travel or reverse travel. In other words, the transmission mechanism 33 is arranged to transmit the driving force generated by the engine 31 to the propellers 32a and 32b with the speed shifted to the low speed reduction ratio (approx. 1.33:1) and the high speed reduction ratio (approx. 1:1) in the forward travel and also to transmit a driving force to the propellers 32a and 32b with the speed shifted to the low speed reduction ratio and the high speed reduction ratio in the reverse travel.

Figure 5:
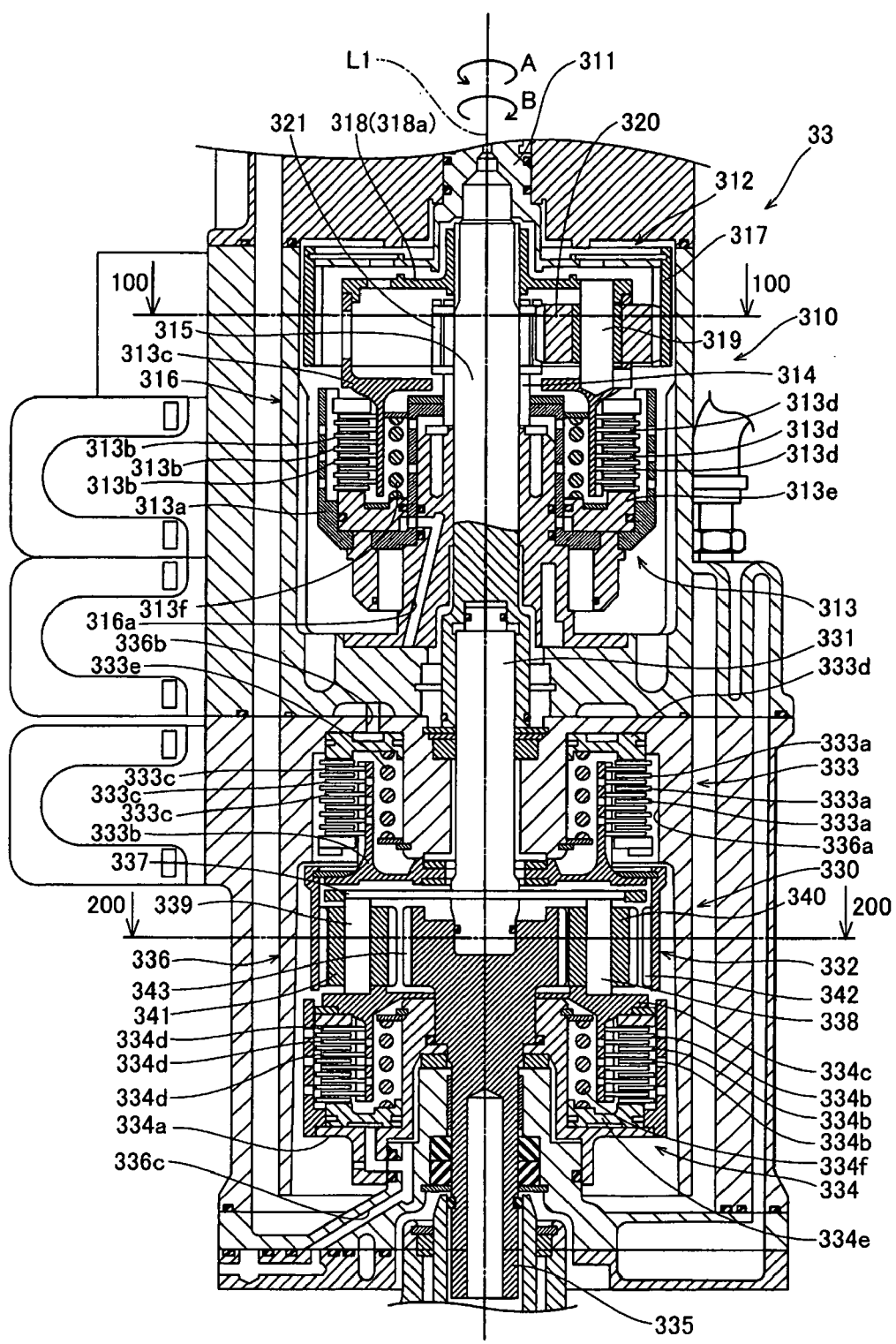
FIG. 5 is a cross-sectional view illustrating a construction of a transmission mechanism of the marine propulsion system main body of the marine propulsion system in accordance with the first preferred embodiment shown in FIG. 1.

As shown in FIG. 5, the upper transmission section 310 includes the upper transmission shaft 311 described above, a planetary gear section 312 arranged to reduce the rotational speed of a driving force of the upper transmission shaft 311, a clutch 313 and a one-way clutch 314 arranged to control a rotation of the planetary gear section 312, an intermediate shaft 315 to which the driving force of the upper transmission shaft 311 is transmitted via the planetary gear section 312, and an upper case section 316 defining a contour of the upper transmission section 310 through a plurality of members. The intermediate shaft 315 rotates at a rotational speed that is substantially the same when compared to the rotational speed of the upper transmission shaft 311 when the clutch 313 is in the engaged state. On the other hand, when the clutch 313 is in the disengaged state, the planetary gear section 312 rotates, and thus the intermediate shaft 315 rotates at a rotational speed that is reduced when compared to the rotational speed of the upper transmission shaft 311.

Figure 6:
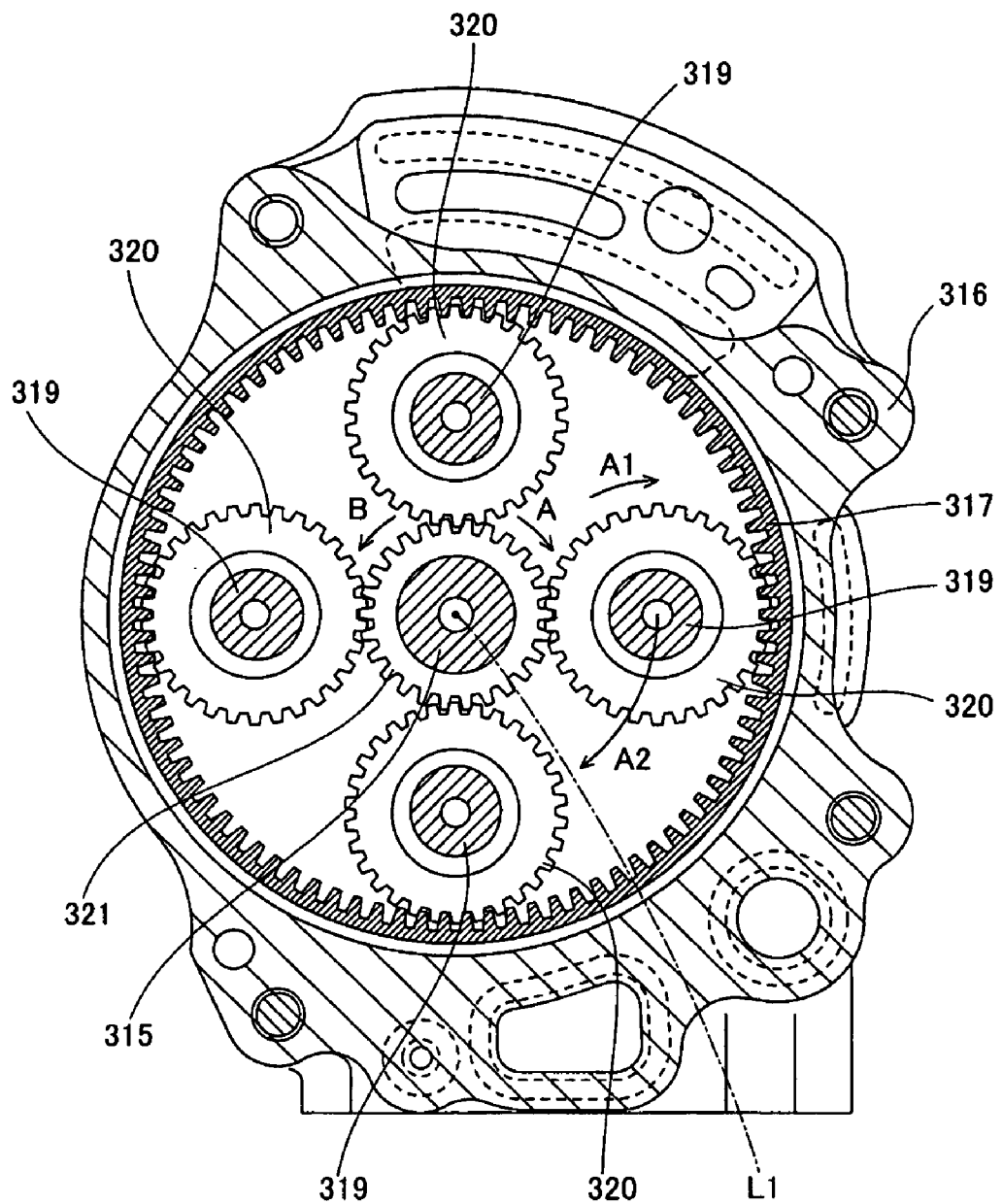
FIG. 6 is a cross-sectional view taken along line 100-100 of FIG. 5.

Specifically, a ring gear 317 is provided on a lower portion of the upper transmission shaft 311. A flange member 318 is fitted to an upper portion of the intermediate shaft 315 by spline-fitting, for example. The flange member 318 is disposed inside the ring gear 317 (on a side facing axial line L1). As shown in FIGS. 5 and 6, four shaft members 319 are fixed to a flange 318a of the flange member 318. Four planetary gears 320 are rotatably mounted on the respective four shaft members 319. Each of the planetary gears 320 is meshed with the ring gear 317. Each of the four planetary gears 320 is meshed with a sun gear 321 arranged to rotate around axial line L1. As shown in FIG. 5, the sun gear 321 is supported by the one-way clutch 314. The one-way clutch 314 is mounted on the upper case section 316 and can rotate only in direction A. Thereby, the sun gear 321 is arranged to rotate in only one direction (direction A).

The clutch 313 is preferably defined by a wet type multi-plate clutch. The clutch 313 is defined mainly by an outer case section 313a supported rotatably in only direction A by the one-way clutch 314, a plurality of clutch plates 313b disposed in an inner periphery of the outer case section 313a at certain intervals from each other, an inner case section 313c at least partially disposed inside the outer case 313a, and a plurality of clutch plates 313d mounted on the inner case section 313c and disposed in spaces between the plurality of clutch plates 313b. The clutch 313 enters the engaged state in which the outer case section 313a and the inner case section 313c unitarily rotate when the clutch plates 313b of the outer case section 313a and the clutch plates 313d of the inner case section 313c contact with each other. Meanwhile, the clutch 313 enters the disengaged state in which the outer case section 313a and the inner case section 313c do not unitarily rotate when the clutch plates 313b of the outer case section 313a and the clutch plates 313d of the inner case section 313c are separated from each other.

Specifically, a piston 313e slidable on an inner peripheral surface of the outer case section 313a is disposed in the outer case section 313a. The piston 313e moves the plurality of the clutch plates 313b of the outer case section 313a in a direction in which the piston 313e slides when it slides on the inner peripheral surface of the outer case section 313a. A compression coil spring 313f is disposed in the outer case section 313a. The compression coil spring 313f is disposed to urge the piston 313e in a direction in which the clutch plates 313b of the outer case section 313a are separated from the clutch plates 313d of the inner case section 313c. The piston 313e slides on the inner peripheral surface of the outer case section 313a against reaction of the compression coil spring 313f when the electromagnetic hydraulic pressure control valve 37 described above increases the pressure of oil flowing through an oil passage 316a of the upper case section 316. Accordingly, the pressure of oil flowing through the oil passage 316a of the upper case section 316 is increased or reduced, thereby allowing contact and separation between the clutch plates 313b of the outer case section 313a and the clutch plates 313d of the inner case section 313c. Therefore, the clutch 313 can be either engaged or disengaged.

Lower ends of the four shaft members 319 are mounted on an upper portion of the inner case section 313c. In other words, the inner case section 313c is connected to the flange member 318 on which upper portions of the four shaft members 319 are mounted through the four shaft members 319. Thereby, the inner case section 313c, the flange member 318, and the shaft members 319 can simultaneously rotate around axial line L1.

The planetary gear section 312 and the clutch 313 are arranged as described above. Therefore, when the clutch 313 is disengaged, the ring gear 317 rotates in direction A together with the upper transmission shaft 311 rotating in direction A. In this case, the sun gear 321 does not rotate in direction B which is opposite to direction A. Therefore, as shown in FIG. 6, each of the planetary gears 320 rotates around the shaft member 319 in direction A1 and at the same time revolves around axial line L1 in direction A2 together with the shaft member 319. Thereby, the flange member 318 (see FIG. 5) rotates around axial line L1 in direction A while the shaft members 319 revolve in direction A2. As a result, the intermediate shaft 315 fitted to the flange member 318 by spline-fitting can be rotated around axial line L1 in direction A at the rotational speed reduced to be lower than the rotational speed of the upper transmission shaft 311.

The planetary gear section 312 and the clutch 313 are arranged as described above. Accordingly, when the clutch 313 is engaged, the ring gear 317 rotates in direction A together with the upper transmission shaft 311 rotating in direction A. In this case, the sun gear 321 does not rotate in direction B that is opposite to direction A. Therefore, each of the planetary gears 320 rotates around the shaft member 319 in direction A1 and at the same time revolves around axial line L1 in direction A2 together with the shaft member 319. At this point, since the clutch 313 is engaged, the outer case section 313a (see FIG. 5) of the clutch 313 rotates in direction A together with the one-way clutch 314 (see FIG. 5). Thereby, the sun gear 321 rotates around axial line L1 in direction A. Therefore, the planetary gears 320 do not substantially rotate around the shaft members 319, but the shaft members 319 revolve around axial line L1. Accordingly, the flange member 318 rotates at a speed that is generally equivalent to the rotational speed of the upper transmission shaft 311 since the speed is substantially not reduced by the planetary gears 320. As a result, the intermediate shaft 315 can be rotated around axial line L1 in direction A at the speed generally equivalent to the rotational speed of the upper transmission shaft 311.

As shown in FIG. 5, the lower transmission section 330 is provided below the upper transmission section 310. The lower transmission section 330 includes an intermediate transmission shaft 331 connected to the intermediate shaft 315, a planetary gear section 332 arranged to reduce the rotational speed of the driving force of the intermediate transmission shaft 331, forward-reverse switching clutches 333 and 334 arranged to control rotation of the planetary gear section 332, a lower transmission shaft 335 to which the driving force of the intermediate transmission shaft 331 is transmitted via the planetary gear section 332, and a lower case section 336 defining a contour of the lower transmission section 330. Further, the lower transmission section 330 is arranged in a manner such that the lower transmission shaft 335 rotates in a direction (direction B) opposite to the rotational direction (direction A) of the intermediate shaft 315 (the upper transmission shaft 311) when the forward-reverse switching clutch 333 is engaged and the forward-reverse switching clutch 334 is disengaged. In this case, the lower transmission section 330 does not rotate the propeller 32b but only rotates the propeller 32a so that the boat 1 can travel rearward. On the other hand, the lower transmission section 330 is arranged in a manner such that the lower transmission shaft 335 rotates in the same direction as the rotational direction (direction A) of the intermediate shaft 315 (the upper transmission shaft 311) when the forward-reverse switching clutch 333 is disengaged and the forward-reverse switching clutch 334 is engaged. In this case, the lower transmission section 330 rotates the propeller 32a in a direction opposite to the case of the reverse travel of the boat 1 and rotates the propeller 32b in a direction opposite to the rotational direction of the propeller 32a so that the boat 1 can travel forward. The lower transmission section 330 is arranged so that the forward-reverse switching clutches 333 and 334 are not engaged at the same time. The lower transmission section 330 is arranged so that rotation of the intermediate shaft 315 (the upper transmission shaft 311) is not transmitted to the lower transmission shaft 335 (the lower transmission section 330 enters the neutral state) when both the forward-reverse switching clutches 333 and 334 are in the disengaged state.

Figure 7:
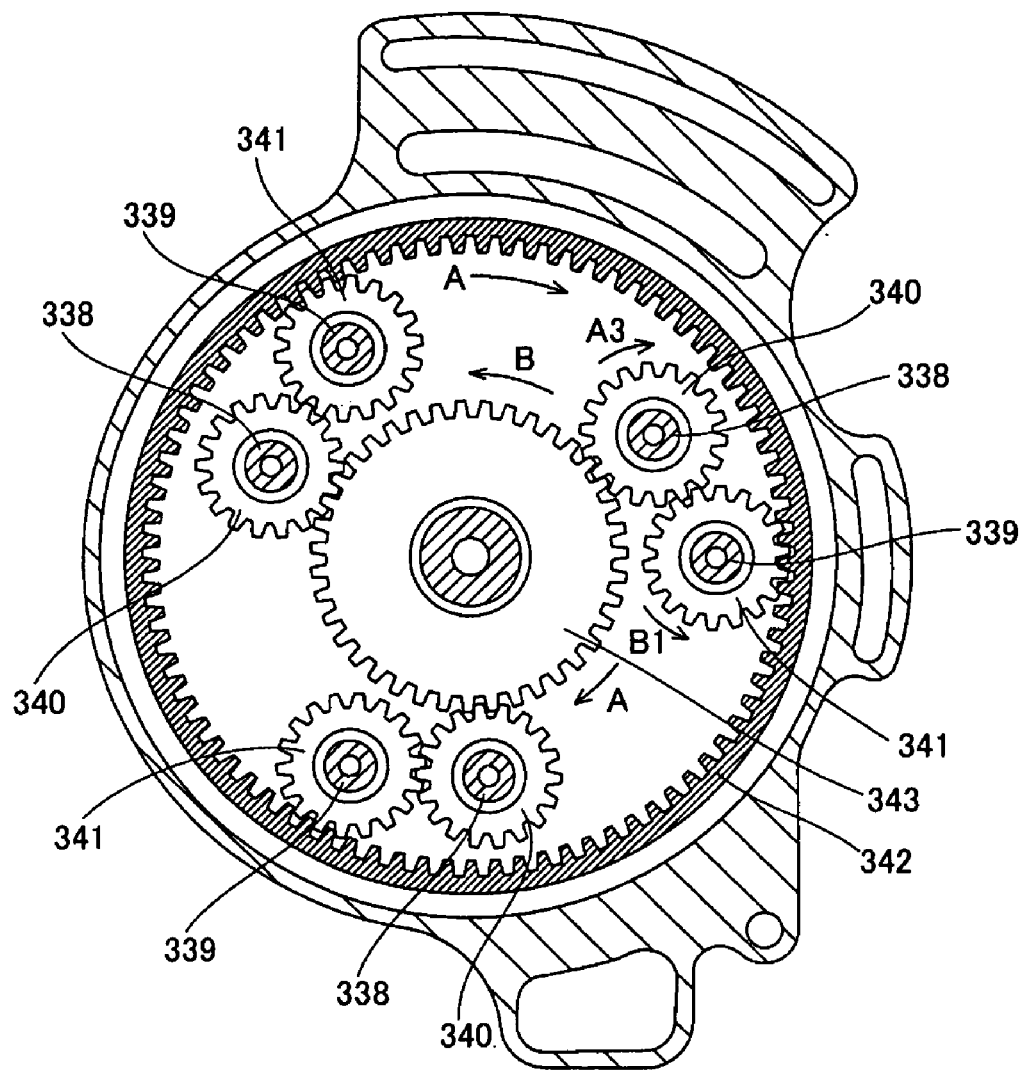
FIG. 7 is a cross-sectional view taken along line 200-200 of FIG. 5.

Specifically, the intermediate transmission shaft 331 rotates together with the intermediate shaft 315. A flange 337 is provided on a lower portion of the intermediate transmission shaft 331. As shown in FIGS. 5 and 7, three inner shaft members 338 and three outer shaft members 339 are fixed to the flange 337. Three planetary gears 340 are rotatably mounted on the respective three inner shaft members 338.

Each of the inner planetary gears 340 is meshed with the sun gear 343 described below. Three outer planetary gears 341 are rotatably mounted on the respective three outer shaft members 339. Each of the three outer planetary gears 341 meshes with the inner planetary gear 340 and with a ring gear 342 described below.

The forward-reverse switching clutch 333 is provided in an upper portion in the lower case section 336. The forward-reverse switching clutch 333 is preferably a wet type multi-plate clutch. A portion thereof is arranged with a recess 336a of the lower case section 336. The forward-reverse switching clutch 333 is defined mainly by a plurality of clutch plates 333a disposed in an inner periphery of the recess 336a at certain intervals from each other, an inner case section 333b at least partially disposed inside the recess 336a, and a plurality of clutch plates 333c mounted on the inner case section 333b and disposed in spaces between the plurality of clutch plates 333a. The forward-reverse switching clutch 333 is arranged in a manner such that the lower case section 336 restrains rotation of the inner case section 333b when the clutch plates 333a of the recess 336a and the clutch plates 333c of the inner case section 333b contact with each other. Meanwhile, the forward-reverse switching clutch 333 is arranged in a manner such that the inner case section 333b freely rotates with respect to the lower case section 336 when the clutch plates 333a of the recess 336a and the clutch plates 333c of the inner case section 333b are separated from each other.

Specifically, a piston 333d slidable on an inner peripheral surface of the recess 336a is disposed in the recess 336a of the lower case section 336. The piston 333d moves the clutch plates 333a of the recess 336a in a direction in which the piston 333d slides when it slides on the inner peripheral surface of the recess 336a. A compression coil spring 333e is preferably disposed in the recess 336a of the lower case section 336. The compression coil spring 333e is disposed to urge the piston 333d in a direction in which the clutch plates 333a of the recess 336a are separated from the clutch plates 333c of the inner case section 333b. The piston 333d slides on the inner peripheral surface of the recess 336a against reaction of the compression coil spring 333e when the electromagnetic hydraulic pressure control valve 37 described above increases the pressure of oil flowing through an oil passage 336b of the lower case section 336. Accordingly, the pressure of oil flowing through the oil passage 336b of the lower case section 336 is increased or reduced, thereby allowing engagement and disengagement of the forward-reverse switching clutch 333.

A ring-shaped ring gear 342 is mounted in the inner case section 333b of the forward-reverse switching clutch 333. As shown in FIGS. 5 and 7, the ring gear 342 meshes with the three outer planetary gears 341.

As shown in FIG. 5, the forward-reverse switching clutch 334 is provided in a lower portion in the lower case section 336 and preferably defined by a wet type multi-plate clutch. The forward-reverse switching clutch 334 is arranged mainly with an outer case section 334a, a plurality of clutch plates 334b disposed in an inner periphery of the outer case section 334a at certain intervals from each other, an inner case section 334c at least partially disposed inside the outer case 334a, and a plurality of clutch plates 334d mounted on the inner case section 334c and disposed in spaces between the plurality of clutch plates 334b. The forward-reverse switching clutch 334 is arranged in a manner such that the inner case section 334c and the outer case section 334a unitarily rotate around axial line L1 when the clutch plates 334b of the outer case section 334a and the clutch plates 334d of the inner case section 334c contact with each other. On the other hand, the forward-reverse switching clutch 334 is arranged in a manner such that the inner case section 334c freely rotates with respect to the outer case section 334a when the clutch plates 334b of the outer case section 334a and the clutch plates 334d of the inner case section 334c are separated from each other.

Specifically, a piston 334e slidable on an inner peripheral surface of the outer case section 334a is disposed in the outer case section 334a. The piston 334e moves the plurality of the clutch plates 334b of the outer case section 334a in a direction in which the piston 334e slides when it slides on the inner peripheral surface of the outer case section 334a. A compression coil spring 334f is disposed in the outer case section 334a. The compression coil spring 334f is disposed to urge the piston 334e in a direction in which the clutch plates 334b of the outer case section 334a are separated from the clutch plates 334d of the inner case section 334c. The piston 334e slides on the inner peripheral surface of the outer case section 334a against reaction of the compression coil spring 334f when the electromagnetic hydraulic pressure control valve 37 described above increases pressure of oil flowing through an oil passage 336c of the lower case section 336. Accordingly, the pressure of oil flowing through the oil passage 336c of the lower case section 336 is increased or reduced, thereby allowing engagement and disengagement of the forward-reverse switching clutch 334.

The three inner shaft members 338 and the three outer shaft members 339 are fixed to the inner case section 334c of the forward-reverse switching clutch 334. In other words, the inner case section 334c is connected to the flange 337 by the three inner shaft members 338 and the three outer shaft members 339 and rotates around axial line L1 together with the flange 337. The outer case section 334a of the forward-reverse switching clutch 334 is mounted on the lower transmission shaft 335 and rotates around axial line L1 together with the lower transmission shaft 335.

The sun gear 343 is unitarily provided with an upper portion of the lower transmission shaft 335. As shown in FIG. 7, the sun gear 343 meshes with the inner planetary gears 340 as described above. The inner planetary gears 340 are meshed with the outer planetary gears 341 meshed with the ring gear 342. The sun gear 343 rotates around axial line L1 in direction B via the inner planetary gears 340 and the outer planetary gears 341 when the flange 337 rotates in direction A together with the intermediate transmission shaft 331 rotating around axial line L1 in direction A when the ring gear 342 does not rotate due to engagement of the forward-reverse switching clutch 333.

The planetary gear section 332, the forward-reverse switching clutches 333 and 334 are arranged as described above. Thereby, when the forward-reverse switching clutch 333 is engaged, the ring gear 342 mounted on the inner case section 333b is fixed to the lower case section 336. At this point, the forward-reverse switching clutch 334 is disengaged as described above. Therefore, the outer case section 334a and the inner case section 334c of the forward-reverse switching clutch 334 can rotate separately. In this case, when the flange 337 rotates around axial line L1 in direction A together with the intermediate transmission shaft 331 rotating around axial line L1 in direction A, each of the three inner shaft members 338 and the three outer shaft members 339 revolve around axial line L1 in direction A. The outer planetary gears 341 mounted on the outer shaft members 339 rotate around the outer shaft members 339 in direction B1. The inner planetary gears 340 rotate around the inner shaft members 338 in direction A3 together with rotation of the outer planetary gears 341. Accordingly, the sun gear 343 rotates around axial line L1 in direction B. As a result, as shown in FIG. 5, the lower transmission shaft 335 rotates around axial line L1 in direction B together with the outer case section 334a although the inner case section 334c rotates around axial line L1 in direction A. Accordingly, the lower transmission shaft 335 can be rotated in the direction (direction B) opposite to the rotational direction (direction A) of the intermediate shaft 315 (the upper transmission shaft 311) when the forward-reverse switching clutch 333 is in the engaged state and the forward-reverse switching clutch 334 is in the disengaged state.

The planetary gear section 332, the forward-reverse switching clutches 333 and 334 are arranged as described above. Thereby, when the forward-reverse switching clutch 333 is disengaged, the ring gear 342 mounted on the inner case section 333b can freely rotate with respect to the lower case section 336. In this case, the forward-reverse switching clutch 334 can enter either the engaged state or the disengaged state.

Next, a case when the forward-reverse switching clutch 334 is engaged will be described. When the flange 337 rotates in direction A together with the intermediate transmission shaft 331 rotating around axial line L1 in direction A, each of the three inner shaft members 338 and the three outer shaft members 339 revolves around axial line L1 in direction A as shown in FIG. 7. In this case, the ring gear 342 meshed with the outer planetary gears 341 rotate freely. Therefore, the inner planetary gears 340 and the outer planetary gears 341 are idle. In other words, the driving force of the intermediate transmission shaft 331 is not transmitted to the sun gear 343. Meanwhile, since the forward-reverse switching clutch 334 is engaged, as shown in FIG. 5, the outer case section 334a rotates around axial line L1 in direction A together with rotation around axial line L1 in direction A of the inner case section 334c which can rotate around axial line L1 in direction A together with the three inner shaft members 338 and the three outer shaft members 339. Accordingly, the lower transmission shaft 335 rotates around axial line L1 in direction A together with the outer case section 334a. As a result, the lower transmission shaft 335 can be rotated in the same direction as the rotational direction (direction A) of the intermediate shaft 315 (the upper transmission shaft 311) when the forward-reverse switching clutch 333 is in the disengaged state and the forward-reverse switching clutch 334 is in the engaged state.

As shown in FIG. 4, a speed reducing device 344 is provided below the transmission mechanism 33. The lower transmission shaft 335 of the transmission mechanism 33 is input to the speed reducing device 344. The speed reducing device 344 is arranged to reduce the rotational speed of the driving force input by the lower transmission shaft 335. The drive shaft 345 is provided below the speed reducing device 344. The drive shaft 345 rotates in the same direction as the lower transmission shaft 335. A bevel gear 345a is provided in a lower portion of the drive shaft 345.

A bevel gear 346a of an inner output shaft 346 and a bevel gear 347a of an outer output shaft 347 are meshed with the bevel gear 345a of the drive shaft 345. The inner output shaft 346 is disposed to extend rearward (direction of arrow BWD). The propeller 32b described above is mounted on a portion of the inner output shaft 346 in the direction of arrow BWD. The outer output shaft 347 extends in the direction of arrow BWD similarly to the inner output shaft 346. The propeller 32a described above is mounted on a portion of the outer output shaft 347 in the direction of arrow BWD. The outer output shaft 347 is preferably hollow. The inner output shaft 346 is inserted in a cavity of the outer output shaft 347. The inner output shaft 346 and the outer output shaft 347 can rotate independently of each other.

The bevel gear 346a meshes with a side of the bevel gear 345a in the direction of arrow FWD. The bevel gear 347a meshes with a side of the bevel gear 345a in the direction of arrow BWD. Thereby, when the bevel gear 346a rotates, the inner output shaft 346 and the outer output shaft 347 rotate in the directions different from each other.

Specifically, the bevel gear 346a rotates in direction A4 when the drive shaft 345 rotates in direction A. The propeller 32b rotates in direction A4 via the inner output shaft 346 together with rotation of the bevel gear 346a in direction A4. Further, when the drive shaft 345 rotates in direction A, the bevel gear 347a rotates in direction B2. The propeller 32a rotates in direction B2 via the outer output shaft 347 together with the rotation of the bevel gear 347a in direction B2. The propeller 32a rotates in direction B2 and the propeller 32b rotates in direction A4 (direction opposite to direction B2). Thereby, the boat 1 travels in the direction of arrow FWD (forward travel direction).

Further, when the drive shaft 345 rotates in direction B, the bevel gear 346a rotates in direction B2. The propeller 32b rotates in direction B2 via the inner output shaft 346 together with rotation of the bevel gear 346a in direction B2. The bevel gear 347a rotates in direction A4 when the drive shaft 345 rotates in direction B. In this case, the outer output shaft 347 does not rotate in direction A4. The propeller 32a rotates neither in direction A4 nor indirection B2. In other words, only the propeller 32b rotates in direction A4. The propeller 32b rotates in direction B2, and thereby the boat 1 travels in the direction of arrow BWD (reverse travel direction).

Figure 8:
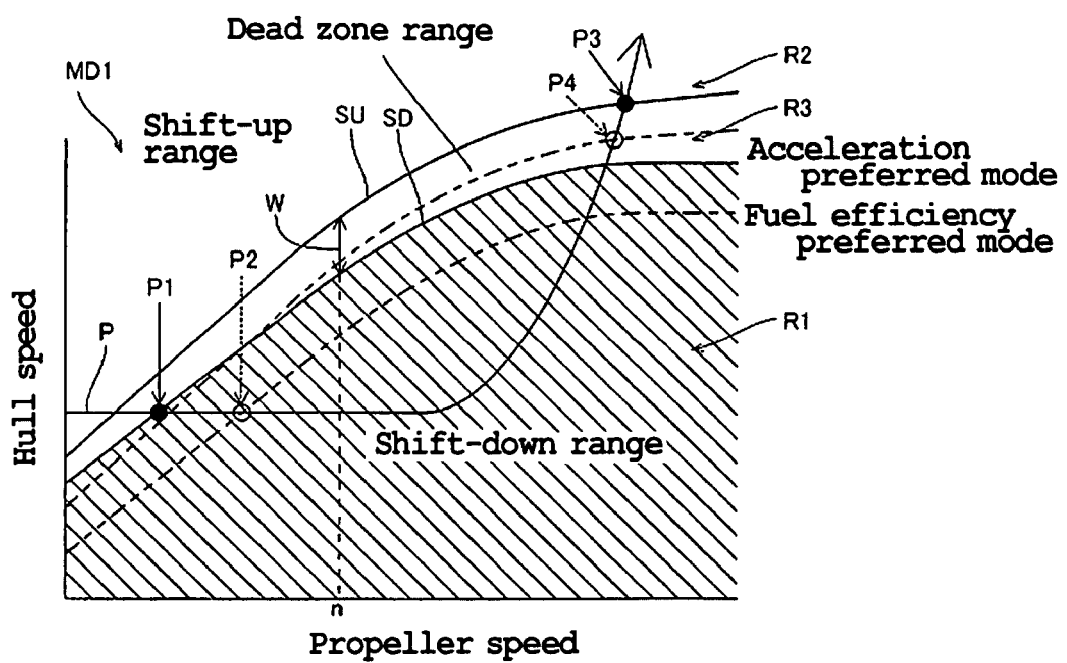
FIG. 8 is a map illustrating a shift-down operation control map for an acceleration preferred mode of the marine propulsion system in accordance with the first preferred embodiment of the present invention.
Figure 9:
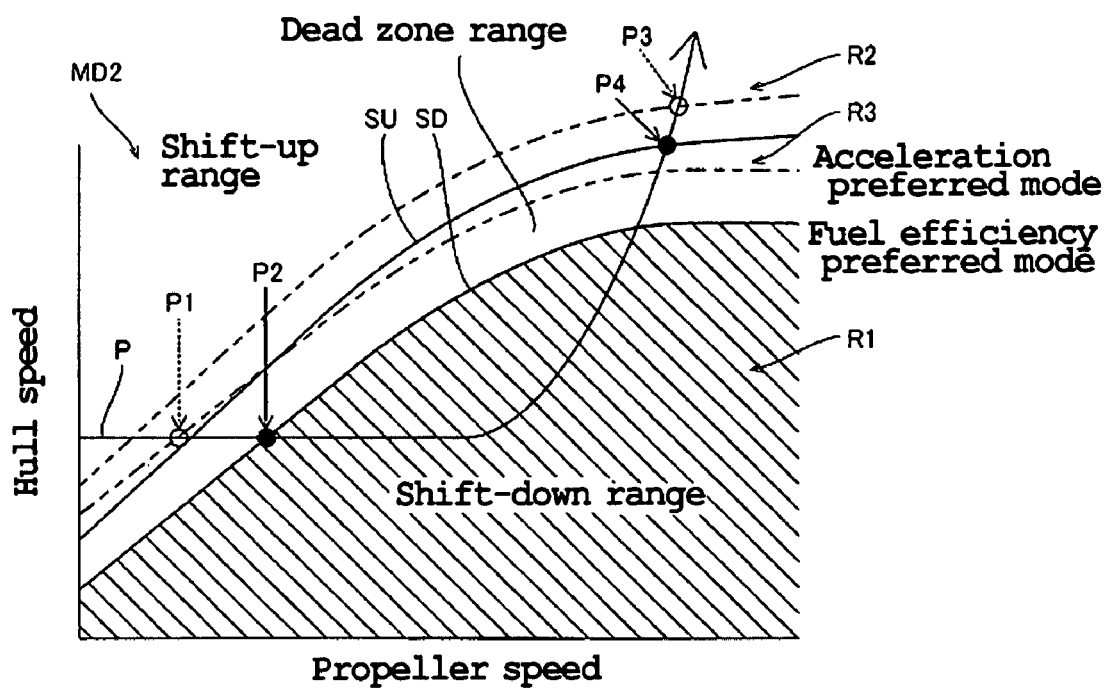
FIG. 9 is a map illustrating a shift-down operation control map for a fuel efficiency preferred mode of the marine propulsion system in accordance with the first preferred embodiment of the present invention.
Figure 10:
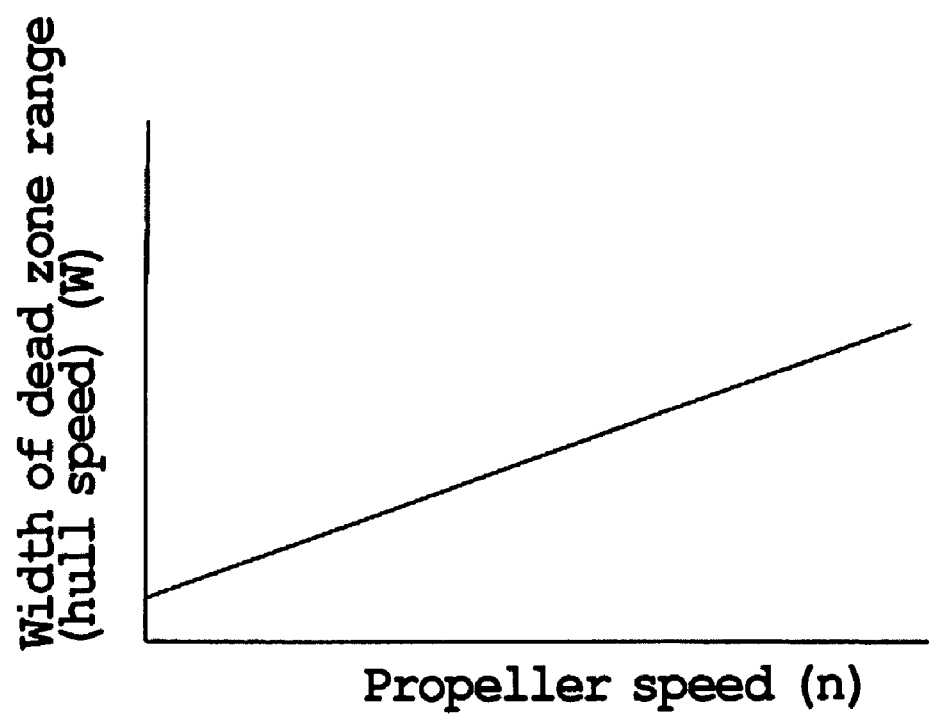
FIG. 10 is a diagram indicating a width of a dead zone range of the shift-down operation control map.
Figure 11:
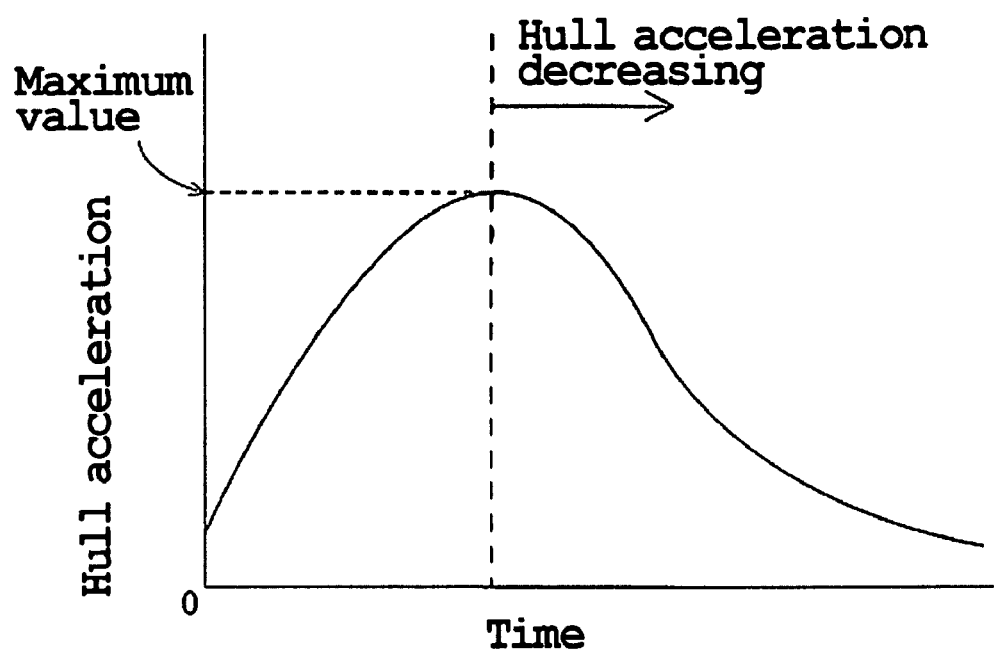
FIG. 11 is a diagram indicating temporal change in acceleration of the hull in normal acceleration.
Figure 12:
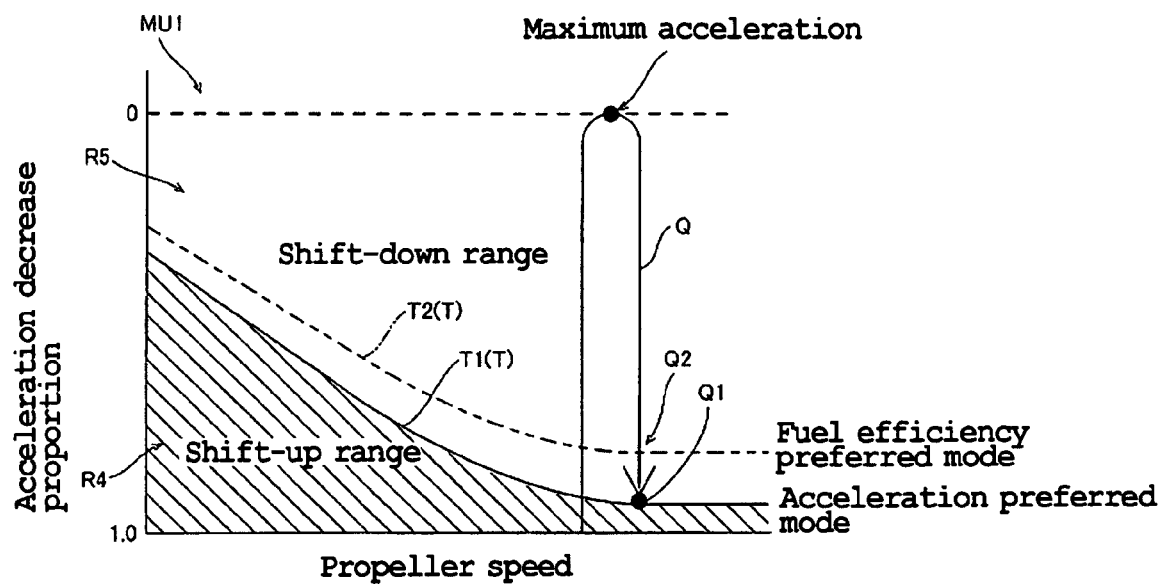
FIG. 12 is a map illustrating a shift-up operation control map for an acceleration preferred mode of the marine propulsion system in accordance with the first preferred embodiment of the present invention.
Figure 13:
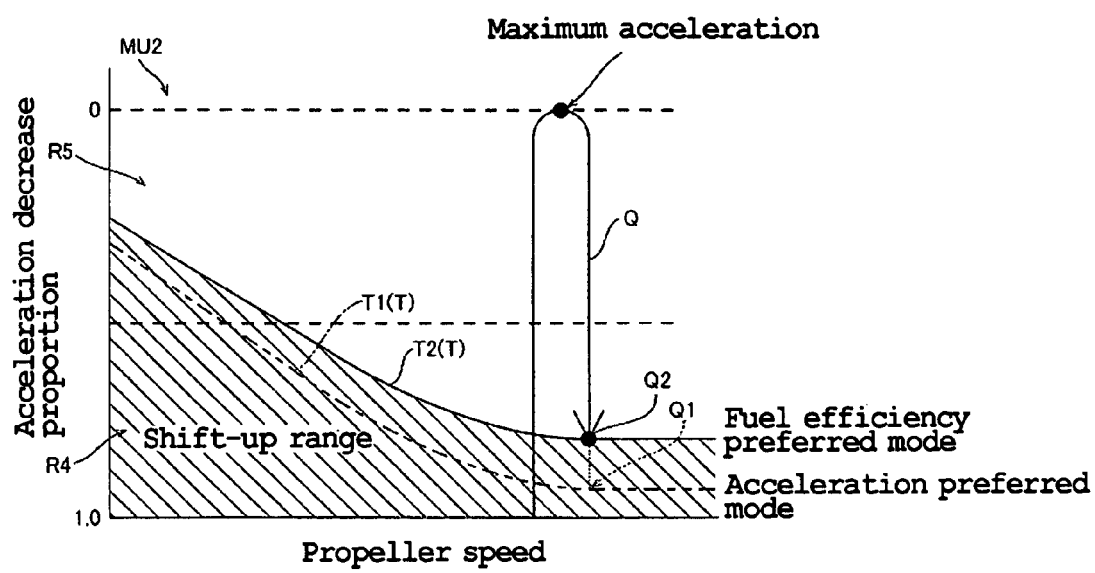
FIG. 13 is a map illustrating a shift-up operation control map for a fuel efficiency preferred mode of the marine propulsion system in accordance with the first preferred embodiment of the present invention.

FIGS. 8 and 9 are maps illustrating the shift-down operation control map stored in the memory portion of the marine propulsion system in accordance with the first preferred embodiment of the present invention. FIG. 10 is a diagram illustrating the shift-down operation control map in detail. FIG. 11 is a diagram indicating the temporal change in the acceleration of the hull in normal lever operation. FIGS. 12 and 13 are maps illustrating the shift-up operation control map stored in the memory portion of the marine propulsion system in accordance with the first preferred embodiment of the present invention. Next, the shift control maps for shift-down and shift-up operations will be described in detail with reference to FIGS. 8 through 13.

As shown in FIG. 11, the acceleration of the hull 2 gradually increases as time elapses in the normal lever operation. The acceleration of the hull 2 gradually decreases after the acceleration reaches a maximum value. Therefore, it is preferable that the transmission mechanism 33 be controlled in the following manner to improve both acceleration performance and fuel efficiency. A shift is made to the low speed reduction ratio with large torque and thereby the hull accelerates when acceleration is required. After the acceleration of the hull 2 reaches the maximum value, a shift is made to the high speed reduction ratio in a state that the acceleration has decreased after the hull 2 has sufficiently accelerated. In the first preferred embodiment, the shift control maps for shift-down and shift-up operations are used in the controlling arrangement described above. The shift-down operation control map and the shift-up operation control map are examples of a "first shift control map" and a "second shift control map", respectively, of the present invention.

As shown in FIGS. 8 and 9, the shift-down operation control map in accordance with the first preferred embodiment is provided by the relationship between the hull speed and the propeller speed. The vertical axis represents the hull speed and the horizontal axis represents the propeller speed on the shift-down operation control map. The shift-down operation control map includes a shift-down range R1 providing the low speed reduction ratio, a shift-up range R2 providing the high speed reduction ratio, and a dead zone range R3 provided at a boundary between the shift-down range R1 and the shift-up range R2. The shift-down range R1, the shift-up range R2, and the dead zone range R3 are examples of a "first range", a "second range", and a "third range" of the present invention, respectively. The shift-down operation control map in accordance with the first preferred embodiment is used for both forward travel and reverse travel.

In the first preferred embodiment, when a locus P on the shift-down operation control map given by the speed of the boat 1 and the propeller speed enters the shift-down range R1 from the shift-up range R2 via the dead zone range R3, the control portion 52 and the ECU 34 control the transmission mechanism 33 so that it performs a shift-down operation (a shift from the high speed reduction ratio to the low speed reduction ratio). In the first preferred embodiment, the shift-down operation control map is applied only in the shift-down operation and not applied in the shift-up operation. The dead zone range R3 is provided to prevent frequent shifts between the speed reduction ratios due to so-called chattering. A shift is not made when the locus P just enters the dead zone range R3 from the shift-up range R2. The dead zone range R3 is provided in a band shape between a shift-down referential curve SD provided on a side abutting the shift-down range R1 providing the low speed reduction ratio and a shift-up referential curve SU provided on a side abutting the shift-up range R2 providing the high speed reduction ratio. As shown in FIG. 10, the width (W) of the dead zone range R3 on the vertical axis (hull speed) is set to become proportionally larger with respect to the propeller speed (n).

In the first preferred embodiment, the memory portion 51 (see FIG. 2) stores a shift-down operation control map MD1 corresponding to an acceleration preferred mode indicated in FIG. 8 and a shift-down operation control map MD2 corresponding to a fuel efficiency preferred mode indicated in FIG. 9. As shown in FIGS. 8 and 9, the shift-down range R1 on the shift-down operation control map MD1 for the acceleration preferred mode is set so that the hull speed value at which shift-down operation is made is, at the same propeller speed, larger than the shift-down range R1 on the shift-down operation control map MD2 for the fuel efficiency preferred mode. Thereby, a period where the transmission mechanism retains the low speed reduction ratio providing large torque is longer in the acceleration preferred mode compared to the fuel efficiency preferred mode. For example, when the hull speed and the propeller speed change along the locus P, shift-down operation is made at time P1 in the acceleration preferred mode as shown in FIG. 8. Meanwhile, shift-down operation is made at time P2 later than time P1 in the fuel efficiency preferred mode as shown in FIG. 9.

As shown in FIGS. 12 and 13, the shift-up operation control map in accordance with the first preferred embodiment is provided by the relationship between the acceleration decrease proportion and the propeller speed. Herein, the acceleration decrease proportion is a decrease proportion of a present acceleration to a maximum acceleration value in the state that the acceleration has decreased after reaching the maximum value (see FIG. 11). The vertical axis represents the acceleration decrease proportion and the horizontal axis represents the propeller speed on the shift-up operation control map. The shift-up operation control map includes a shift-up range R4 for providing the high speed reduction ratio and a shift-down range R5 providing the low speed reduction ratio. A boundary curve T between the shift-up range R4 and the shift-down range R5 is a curve such that the acceleration decrease proportion becomes larger as the propeller speed becomes larger. The shift-up range R4 is an example of a "fourth range" of the present invention. The shift-up operation control map in accordance with the first preferred embodiment is used for both the forward travel and the reverse travel.

In the first preferred embodiment, when a locus Q on the shift-up operation control map given by the acceleration decrease proportion and the propeller speed enters the shift-up range R4 from the shift-down range R5, the control portion 52 and the ECU 34 control the transmission mechanism 33 so that it makes shift-up operation (shift from the low speed reduction ratio to the high speed reduction ratio).

The memory portion 51 stores a shift-up operation control map MU1 corresponding to the acceleration preferred mode indicated in FIG. 12 and a shift-up operation control map MU2 corresponding to the fuel efficiency preferred mode indicated in FIG. 13. As shown in FIGS. 12 and 13, the shift-up range R4 defined by a boundary curve T1 on the shift-up operation control map MU1 for the acceleration preferred mode is set so that the acceleration decrease proportion at which shift-up operation is made is, at the same propeller speed, larger than the shift-up range R4 defined by a boundary curve T2 on the shift-up operation control map MU2 for the fuel efficiency mode. Thereby, a time that the transmission mechanism shifts from the low speed reduction ratio providing large torque to the high speed reduction ratio is delayed in the acceleration preferred mode compared to the fuel efficiency preferred mode. For example, when the acceleration decrease proportion and the propeller speed change as indicated by locus Q, shift-up operation is made at time Q2 in the fuel efficiency preferred mode as shown in FIG. 13. Meanwhile, shift-up operation is made at time Q1 later than time Q2 in the acceleration preferred mode as shown in FIG. 12. Accordingly, the acceleration performance is enhanced in the acceleration preferred mode since the period for the low speed reduction ratio providing large torque is long.

Figure 14:
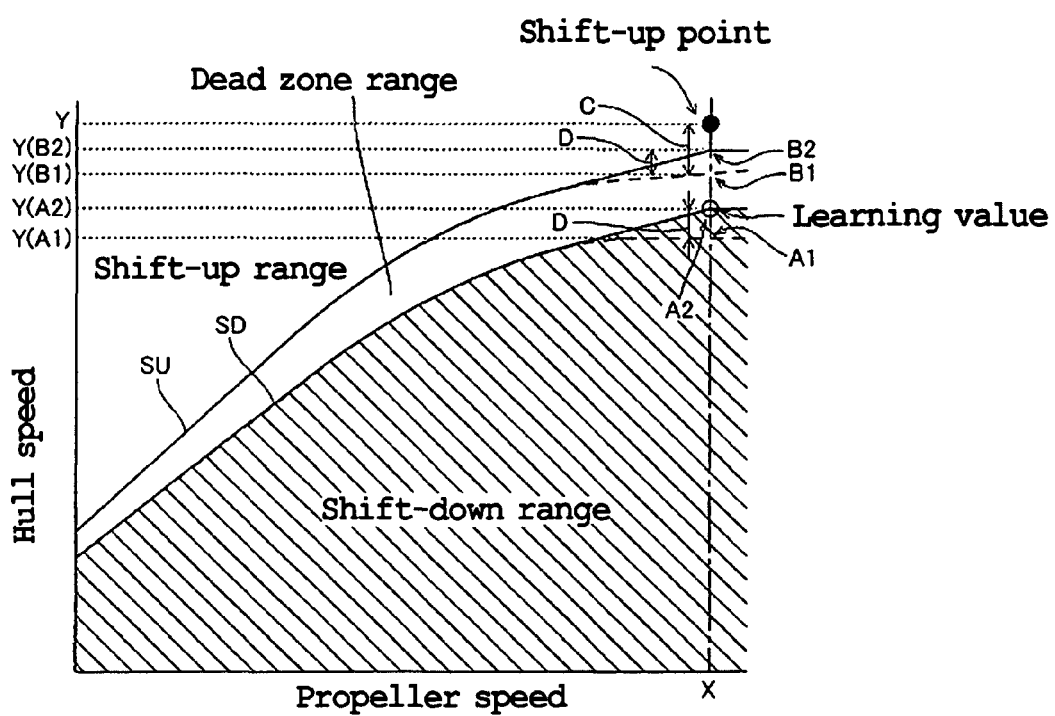
FIG. 14 is a map describing adjustment steps of the shift-up operation control map of the marine propulsion system in accordance with the first preferred embodiment of the present invention.

The control portion 52 adjusts the shift-down operation control map with use of the timings for shifts determined based on the shift-up operation control map. FIG. 14 is a map describing adjustment steps of the shift-down operation control map. The adjustment steps of the shift-down operation control map will be specifically described hereinafter with reference to FIG. 14. Now, descriptions will be made about a case that the shift-down operation control map MD1 for the acceleration preferred mode shown in FIG. 8 is adjusted. In FIG. 14, the propeller speed and the hull speed when a shift is made to the high speed reduction ratio based on the shift-up operation control map will be expressed by X and Y, respectively. First, assume that a boundary point between the shift-down range R1 and the dead zone range R3 at a propeller speed (X) on the shift-up operation control map before adjustment is A1 and a boundary point between the shift-up range R2 and the dead zone range R3 before adjustment is B1. Similarly, a boundary point between the shift-down range R1 and the dead zone range R3 at the propeller speed (X) on the shift-up operation control map after adjustment is A2 and a boundary point between the shift-up range R2 and the dead zone range R3 after adjustment is B2.

In the first preferred embodiment, if there is a difference between a hull speed Y (a shift-up point indicated in FIG. 14) when a shift-up operation is made based on the shift-up operation control map and the boundary point B1 between the shift-up range R2 and the dead zone range R3 on the shift-down operation control map, adjustment is made so that a hull speed Y(B1) at the boundary point B1 approaches the hull speed Y at the shift-up point. A value of the hull speed Y in shifting up may vary at the same propeller speed due to external factors such as waves and winds. If the hull speed Y(B1) at the boundary point B1 were adjusted by an adjustment amount C, the hull speed Y(B1) would be adjusted to the hull speed Y at the shift-up point. However, the adjustment is made by an adjustment amount D smaller than the adjustment amount C in consideration of the variation of the value. In the first preferred embodiment, the adjustment amount D is determined to be D=C/2. Further, the adjustment is made so that the boundary point B1 approaches the shift-up point by the adjustment amount D, and at the same time the boundary point A1 approaches the shift-up point by the adjustment amount D. The boundary points A1 and B1 are made to approach the shift-up point by the adjustment amount D as described above, and thereby the boundary point between the shift-up range R2 and the dead zone range R3 on the shift-down operation control map after the adjustment is B2 and the boundary point between the shift-down range R1 and the dead zone range R3 is A2. A width (Y(B1)−Y(A1)) of the dead zone range R3 before the adjustment is equal to a width (Y(B2)−Y(A2)) of the dead zone range R3 after the adjustment. The above adjustment steps are made every time the shift-up operation is made. Accordingly, the shift-down operation control map can be adjusted so that shift-down operation is made at an optimal timing according to an actual circumstance in application.

Figure 15:
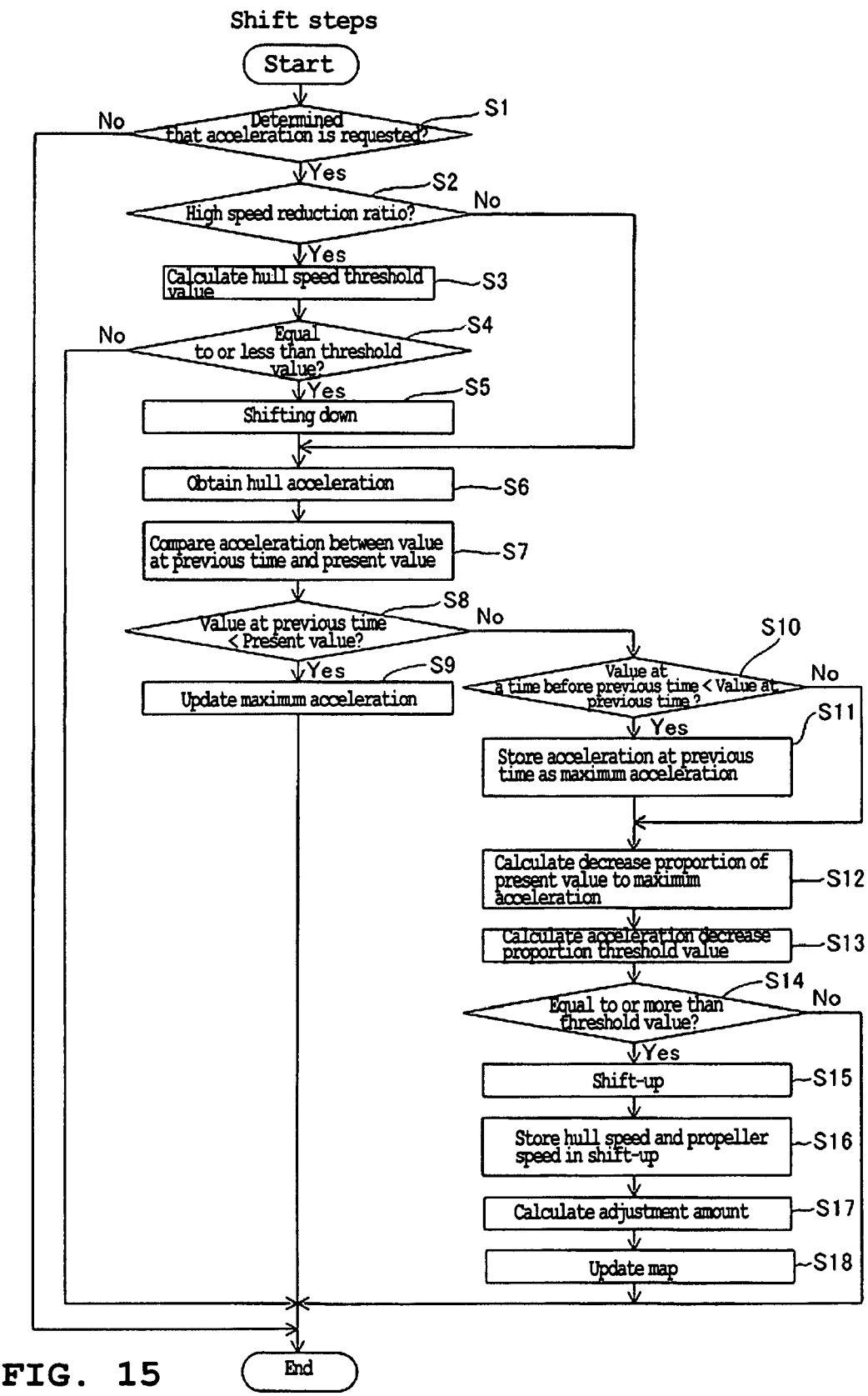
FIG. 15 is a flowchart demonstrating shift steps of the marine propulsion system in accordance with the first preferred embodiment of the present invention.

FIG. 15 is a flowchart demonstrating shift steps of the marine propulsion system in accordance with the first preferred embodiment of the present invention. Next, the shift steps of the marine propulsion system in accordance with the first preferred embodiment will be described with reference to FIGS. 8, 9, and 11 through 15. The shift steps are for controlling the transmission mechanism to retain the high speed reduction ratio in normal traveling and shifts to the low speed reduction ration only when acceleration is required, in order to improve both acceleration performance and fuel efficiency of the hull. A series of the steps demonstrated in the flowchart is made approximately every 100 milliseconds.

When the operator of the boat turns the lever 5a to propel the hull 2, the control portion 52 determines whether acceleration is requested or not in step S1 in FIG. 15. Specifically, the control portion 52 calculates a change amount of the lever opening of the lever 5a in a unit period (lever turning speed). If the lever turning speed is smaller than a certain value (if the lever 5a is slowly turned), the control portion 52 determines that the operator is not requesting acceleration. Accordingly, the shift steps end. If the lever turning speed is larger than a predetermined value (if the lever 5a is quickly turned), the control portion 52 determines that the operator is requesting acceleration. If the control portion 52 determines that the operator is requesting acceleration and if the lever turning speed is relatively large, the control portion 52 determines that the operator desires acceleration and selects the acceleration preferred mode. When the lever turning speed is relatively small, the control portion 52 determines that the operator desires fuel efficiency and selects the fuel efficiency preferred mode.

Thereafter, when the control portion 52 has determined which mode to select between the acceleration preferred mode and the fuel efficiency preferred mode, the control portion 52 determines whether the transmission mechanism is in the high speed reduction ratio or the low speed reduction ratio in step S2. The process goes to step S6 if the transmission mechanism is in the low speed reduction ratio. If the transmission mechanism is in the high speed reduction ratio, the control portion 52 calculates the threshold value (hull speed) for shift-down operation with use of the shift-down operation control map (FIGS. 8 and 9). Specifically, the control portion 52 calculates the threshold value for a shift-down operation based on the boundary curve D between the shift-down range R1 and the dead zone range R3 and a present propeller speed. At this point, the shift-down operation control map MD1 shown in FIG. 8 is used if it is determined that the acceleration preferred mode is selected in step S1. The shift-down operation control map MD2 shown in FIG. 9 is used if it is determined that the fuel efficiency preferred mode is selected.

Next, in step S4, the control portion 52 determines whether or not a present hull speed is equal to or less than the threshold value calculated in step S3. If the present hull speed is larger than the threshold value, the control portion 52 determines that shift-down operation is not required. The shift steps end while retaining the high speed reduction ratio. If the present hull speed is equal to or less than the threshold value, shift-down operation (a shift from the high speed reduction ratio to the low speed reduction ratio) is made in step S5.

Further, when a shift has been made to the low speed reduction ratio, the control portion 52 obtains the acceleration of the hull detected by the acceleration sensor 55 in step S6. A comparison is made between an acceleration value in the shift steps at a previous time (approximately 100 milliseconds earlier) and the present acceleration value in steps S7. If it is determined that the acceleration value at the previous time is smaller than the present acceleration value in step S8, the acceleration is increasing and thus the present acceleration is stored as a maximum acceleration in the memory portion 51 in step S9. In this case, the acceleration has not yet reached the maximum value and is not sufficient. Therefore, the shift steps end when a shift is made to the low speed reduction ratio.

If it is determined that the acceleration value at the previous time is larger than the present acceleration value in step S8, the control portion 52 determines whether or not an acceleration value at a time before the previous time is larger than the acceleration value at the previous time in step S10. If the acceleration value at the time before the previous time is larger than the acceleration value at the previous time, the acceleration is decreasing from the time before the previous time to the present time. Therefore, the process goes to step S12 without updating the maximum acceleration. If, however, the acceleration value at the time before the previous time is smaller than the acceleration value at the previous time, the acceleration value at the previous time is the maximum value of acceleration, the acceleration at the previous time is stored in the memory portion 51 as the maximum acceleration in step S11.

Next, the decrease proportion of the present acceleration to the maximum acceleration stored in the memory portion 51 is calculated in step S12. The threshold value for shift-up operation is calculated with use of the shift-up operation control map (see FIGS. 12 and 13) in step S13. Specifically, the control portion 52 calculates the threshold value of the acceleration decrease proportion for shift-up operation based on the boundary curve T defining the shift-up range R4 of the shift-up operation control map and a present propeller speed. At this point, the shift-up operation control map MU1 shown in FIG. 12 is used if it is determined that the acceleration preferred mode is selected in step S1. The shift-up operation control map MU2 shown in FIG. 13 is used if it is determined that the fuel efficiency preferred mode is selected.

Next, in step S14, the control portion 52 determines whether or not a present acceleration decrease proportion is equal to or less than the threshold value calculated in step S13. If the present acceleration decrease proportion is smaller than the threshold value, the control portion 52 determines that the acceleration is not sufficient. The shift steps end while retaining the low speed reduction ratio. If the present acceleration decrease proportion is larger than the threshold value, the control portion 52 determines that sufficient acceleration has been made. Shift-up operation (a shift from the low speed reduction ratio to the high speed reduction ratio) is made in step S15.

In step S16, the hull speed and the propeller speed in the shift-up operation in step S15 are stored in the memory portion 51. The control portion 52 calculates the adjustment amount D in step S17. Specifically, the control portion 52 calculates a half value of the difference C between the hull speed Y(B1) at the boundary point B1 and the hull speed Y for shifting up in FIG. 13 as the adjustment amount D. The control portion 52 updates the shift-down operation control map based on the adjustment amount D in step S18. Specifically, as shown in FIG. 14, the adjustment amount D is added to each of the hull speed Y(A1) at the boundary point A1 and the hull speed Y(B1) at the boundary point B1, and thereby the adjustment is made so that the boundary point at the propeller speed (X) between the shift-down range R1 and the dead zone range R3 becomes A2 and the boundary point between the shift-up range R2 and the dead zone range R3 becomes B2. In the shift steps after the adjustment, shift-down operation is made with use of the adjusted shift-down operation control map. The shift steps of the marine propulsion system in accordance with the first preferred embodiment are made as described above.

In the first preferred embodiment, as in the foregoing descriptions, the transmission mechanism 33 is provided, which can transmit the driving force generated by the engine 31 to the propellers 32a and 32b with the speed shifted at least to the low speed reduction ratio and the high speed reduction ratio. As described above, the transmission mechanism 33 is arranged in a manner such that the driving force generated by the engine 31 can be transmitted to the propellers 32a and 32b with the speed shifted to the low speed reduction ratio. Accordingly, acceleration performance in the low speed position can be improved. Further, the transmission mechanism 33 is arranged in a manner such that the driving force generated by the engine 31 can be transmitted to the propellers 32a and 32b with the speed shifted to the high speed reduction ratio. This allows a larger maximum speed to be obtained. As a result, both the acceleration performance and the maximum speed can approach levels that the operator of the boat desires.

In the first preferred embodiment, as described above, the positional information of the hull 2 is obtained by the GPS sensor 56 and the hull speed is calculated by the control portion 52. This allows a hull speed that directly and comprehensively reflects an actual state of the hull 2 including the state of the engine and the influences outside of the engine (such as waves, shape and size of the hull) to be obtained. A shift is made based on the hull speed, and thereby a shift can be made at a timing more accurately corresponding to an actual state of the hull 2 differently from the case that the state of the hull 2 is estimated from the state of the engine 31 (engine load such as throttle opening and intake air pressure) and the like, and a shift is made based on the estimated state of the hull 2.

In the first preferred embodiment, as described above, a shift is made based on the hull speed and the propeller speed. Accordingly, a shift can be made at the timing more accurately corresponding to an actual state of the hull 2. In other words, the hull speed directly reflects an actual state of the hull and the propeller speed directly reflects the propulsion of the boat. Therefore, a shift is made based on the hull speed and the propeller speed, and thereby a shift can be made at the timing more accurately corresponding to an actual state of the hull 2 differently from the case that the propulsion of the boat 1 is estimated from the engine load and so forth.

In the first preferred embodiment, as described above, the dead zone range R3 is provided on the shift-down operation control map (see FIGS. 8 and 9). It prevents frequent occurrences of an unnecessary shift as a result of so-called chattering around a boundary between the shift-up range and the shift-down range when the dead zone range R3 is not provided, when a shift is made based on the shift-down operation control map.

In the first preferred embodiment, as described above, a shift is made with use of the shift control maps (the shift-up operation control map and the shift-down operation control map) corresponding to the acceleration preferred mode and the shift control maps corresponding to the fuel efficiency preferred mode. Accordingly, when the operator desires acceleration, a time at which a shift from the low speed to the high speed is made can be delayed based on the shift control map for the acceleration preferred mode in which the shift-up ranges R2 and R4 are set to be narrower. Thereby, the state that the transmission mechanism is in the low speed reduction ratio is retained for a longer period, so that larger acceleration can be obtained. Further, when the operator desires fuel efficiency, a time at which a shift from the low speed to the high speed is made can be set relatively earlier based on the shift control map for the fuel efficiency preferred mode in which the shift-up ranges R2 and R4 are set to be wider. Thereby, the state that the transmission mechanism is in the high speed reduction ratio is retained for a longer period, so that fuel efficiency can be improved.

In the first preferred embodiment, as described above, the acceleration sensor 55 arranged to detect the acceleration of the hull 2 is provided. Accordingly, when the marine propulsion system according to a preferred embodiment of the present invention is applied to the hulls of models having different sizes and/or shapes, the control portion 52 can recognize an actual accelerating state of each kind of a hull. Thereby, the control portion 52 can recognize an actual accelerating state which differs between models of hulls differently from a case where the accelerating state of the hull is estimated from the engine speed, the throttle opening, and so forth. The transmission mechanism 33 is controlled so a shift-up based on the acceleration of the hull 2, and thereby shift-up operation can be made in response to an actual acceleration state of the hull. Thereby, shift-up operation can be made at an optimal timing corresponding to each hull model.

In the first preferred embodiment, as described above, after the acceleration of the hull 2 starts decreasing from the maximum value, a shift is made from the low speed reduction ratio to the high speed reduction ratio when the decrease proportion of the acceleration of the hull 2 to the maximum value exceeds the certain threshold value. Accordingly, a shift can be made from the low speed reduction ratio to the high speed reduction ratio in a state that the hull 2 has been sufficiently accelerated.

In the first preferred embodiment, as described above, the shift-down operation control map is adjusted with use of the propeller speed and the hull speed in shifting from the low speed reduction ratio to the high speed reduction ratio. Accordingly, the shift-down operation control map can be updated so that shift-down operation is made at an optimal timing. In other words, it is considered that the shift-up timing determined based on the acceleration of the hull 2 is an optimal timing reflecting the accelerating state of the hull 2. Therefore, the shift-down timing is adjusted based on the shift-up timing (the propeller speed and the hull speed).

Thereby, the shift-down operation control map can be updated so that shift-down operation is made also at an optimal timing. This allows the control portion to learn an optimal shift-down timing corresponding to each kind of the hull 2 when the outboard motor 3 is installed in the hull 2 of a different model.

Second Preferred Embodiment

Next, a marine propulsion system in accordance with a second preferred embodiment of the present invention will be described with reference to FIGS. 8 and 9. In the second preferred embodiment, descriptions will be made about a case that the shift-down operation control map is used for shift-down and shift-up operations differently from the first preferred embodiment. An arrangement of the boat 1 is similar to the first preferred embodiment except that the accelerator sensor 55 is not provided. A configuration of the shift-down operation control map (see FIGS. 8 and 9) is similar to the first preferred embodiment, and description of all the features included therein will not be made again.

In the second preferred embodiment, when a locus P on the shift-down operation control map given by the speed of the boat 1 and the propeller speed enters the shift-down range R1 from the shift-up range R2 via the dead zone range R3, the control portion 52 and the ECU 34 controls the transmission mechanism 33 so that it makes a shift-down operation (shift from the high speed reduction ratio to the low speed reduction ratio). Further, the control portion 52 and the ECU 34 control the transmission mechanism 33 so that it shifts up (shifts from the low speed reduction ratio to the high speed reduction ratio) when the locus P enters the shift-up range R2 from the shift-down range R1 via the dead zone range R3.

For example, when the hull speed and the propeller speed change along the locus P, shift-down operation is made at time P1 and shift-up operation is made at time P3 in the acceleration preferred mode as shown in FIG. 8. Meanwhile, a shift-down operation is performed at time P2 that is later than time P1, and a shift-up operation is performed at time P4 that is earlier than time p3 in the fuel efficiency preferred mode as shown in FIG. 9.

In the second preferred embodiment, as described above, shift-down and shift-up operations are made with use of the shift-down operation control map. This facilitates the shift control since the shift-up operation control map is not used.

Effects of the second preferred embodiment other than those described above are similar to the first preferred embodiment.

Other Preferred Embodiments

It should be understood that the preferred embodiments disclosed in the foregoing is an exemplary case in all the aspects and does not limit the present invention. It is intended that the scope of the present invention be defined not by the preferred embodiments discussed in the foregoing descriptions but solely by the appended claims. Further, the present invention includes all modifications within meanings equivalent to the claims and the scope thereof.

For example, in the first and second preferred embodiments, descriptions are made about the marine propulsion system including the two outboard motors in which the engine and the propellers are disposed outside of the hull as an exemplary case. However, the present invention is not limited to this case, but can be applied to other marine propulsion systems including a stern drive in which an engine is fixed to a hull, an inboard motor in which an engine and a propeller are fixed to a hull, and so forth. Furthermore, the present invention can be applied to a marine propulsion system including a single outboard motor.

In the first preferred embodiment, descriptions are made about a case that the control portion 52 calculates the hull speed with use of the GPS sensor 56. However, the present invention is not limited to this case, but the hull speed may be calculated from acceleration information obtained by the acceleration sensor 55.

In the first preferred embodiment, descriptions are provided of a case where the horizontal axis of the shift-up operation control map preferably represents the propeller speed. However, the present invention is not limited to this case, but the horizontal axis may represent the engine speed. When the transmission mechanism is in an engaged state (the shift position is forward or reverse), the propeller speed can be estimated from the engine speed. Further, the horizontal axis of the shift-up operation control map may represent the accelerator opening, throttle opening, or intake air pressure of the engine, for example.

In the first preferred embodiment, descriptions are made about a case where the propeller speed sensor 38 is provided on the drive shaft 345. However, the present invention is not limited to this case, but the propeller speed sensor 38 may be provided on any of the lower transmission shaft 335, the inner output shaft 346, or the outer output shaft 347, for example.

In the first and second preferred embodiments, descriptions are made about the marine propulsion system including the outboard motor having the two propellers as an exemplary case. However, the present invention is not limited to this case, but can be applied to other marine propulsion systems including an outboard motor having a single, three, or more propellers.

In the first and second preferred embodiments, descriptions are made about a case that the shift control map for the reverse travel of the boat has a configuration similar to the shift control map for the forward travel of the boat. However, the present invention is not limited to this case. Two shift control maps, in which one is dedicated to forward travel and the other is dedicated to reverse travel, may be provided.

In the first and second preferred embodiments, descriptions are provided of a case where the control portion and the ECU are preferably connected together by the common LAN cables and thereby communication can be made. However, the present invention is not limited to this case. Communication between the control portion and the ECU may be realized by wireless communication, or any other desired communication medium.

In the first and second preferred embodiments, the shift position signal is transmitted from the control portion to the ECU via only the common LAN cable 7, and the accelerator opening signal is transmitted from the control portion to the ECU via only the common LAN cable 8. However, the present invention is not limited to this case. Both the shift position signal and the accelerator opening signal may be transmitted from the control portion to the ECU by the same common LAN cable. Further, the shift position signal may be transmitted from the control portion to the ECU via only the common LAN cable 8. The accelerator opening signal may be transmitted from the control portion to the ECU via only the common LAN cable 7.

In the above preferred embodiments, descriptions are provided of a case in which two outboard motors are preferably provided. However, the present invention is not limited to this case, but a single, three, or more outboard motors may be provided. In a case of having a plurality of outboard motors, timing for shifts may be synchronized among all the outboard motors. In this case, one of the outboard motors is used as a main outboard motor, and thereby shift control may be made for the other outboard motors simultaneously with shift control of the transmission mechanism of the main outboard motor. Specifically, the shift control may be made in the following manner. The control portion 52 outputs the "speed changing gear shift signal" to the ECU of the main outboard motor based on the shift control map stored in the memory portion 51 of the control lever section 5. The ECU of the main outboard motor outputs a "driving signal" or a "non-driving state retaining signal" to its own electromagnetic hydraulic pressure control valve 37 based on the "speed changing gear shift signal". Thereby, the upper transmission section 310 is shifted to the low speed reduction ratio. The ECU of the main outboard motor outputs the "driving signal" or "non-driving state retaining signal" to the ECUs installed in the other outboard motors via the common LAN. The ECUs of the other outboard motor output the "driving signal" or "non-driving state retaining signal" to their own electromagnetic hydraulic pressure control valves 37 based on the signals sent from the ECU of the main outboard motor. Thereby, the upper transmission section 310 of the main outboard motor and the upper transmission sections 310 of the outboard motors other than the main outboard motor are shifted to the low speed position in a synchronized manner.

Each ECU of the plurality of the outboard motors may output the shift control signal not only to its own transmission mechanism but also to the transmission mechanisms of the other outboard motors. In addition, each of the transmission mechanisms may shift based on the shift control signal sent the earliest among the shift control signals from the plurality of the ECUs. Specifically, the shift control may be made in the following manner. The control portion 52 outputs the "speed changing gear shift signal" to the ECU of every outboard motor based on the shift control map stored in the memory portion 51 of the control lever section 5. The ECU of each of the outboard motors outputs the "driving signal" or "non-driving state retaining signal" to its own electromagnetic hydraulic pressure control valve 37 based on the "speed changing gear shift signal" and at the same time outputs the "driving signal" or "non-driving state retaining signal" to the electromagnetic hydraulic pressure control valves 37 of the other outboard motors via the common LAN. A switch between driving state and non-driving state is made in the electromagnetic hydraulic pressure control valve 37 of each of the outboard motors based on the "driving signal" or "non-driving state retaining signal" sent the earliest. Thereby, the upper transmission section 310 of each of the plurality of the outboard motors is shifted to the low speed position in a synchronized manner.

As described above, when timings for shifts are synchronized among all the outboard motors, the control portion 52 of the control lever section 5 outputs the "speed changing gear shift signal" if any of the following conditions is satisfied. The control portion 52 outputs the "speed changing gear shift signal" if an operating state of at least any one of the plurality of outboard motors satisfies a condition for a shift or if the operating state of a particular outboard motor among the plurality of the outboard motors satisfies the condition for a shift.

In the above preferred embodiments, descriptions are provided of a case where the shift control maps are stored in the memory portion 51 included in the control lever section 5 and the control signals for making the transmission mechanism 33 shift the speed reduction ratios preferably is output from the control portion 52 included in the control lever section 5. However, the present invention is not limited to this case. The shift control maps may be stored in the ECU 34 provided in the outboard motor. In this case, the control signals may be output from the ECU 34 in which the shift control maps are stored. Further, an ECU other than the ECU controlling the engine is provided, and thereby the ECU may store the shift control maps and outputs the control signals.

In the above preferred embodiments, descriptions are provided of a case where the shift between forward, neutral, and reverse is made by the lower transmission section 330 electrically controlled by the ECU 34. However, the present invention is not limited to this case. The shift between forward, neutral, and reverse may be made by a forward-reverse switching mechanism arranged with a pair of bevel gear and dog clutch as disclosed in JP-A-Hei 9-263294.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A marine propulsion system comprising:
    an engine;
    a propeller that is rotated by the engine;
    a transmission mechanism that operates in at least a lower speed reduction ratio and a higher speed reduction ratio, and transmits a driving force of the engine to the propeller with a speed thereof shifted to one of the lower speed reduction ratio and the higher speed reduction ratio;
    a speed detection portion that detects a speed of a hull propelled by a rotation of the propeller; and
    a control portion that controls a shift between the lower speed reduction ratio and the higher speed reduction ratio of the transmission mechanism; wherein
    the control portion controls a shift between the lower speed reduction ratio and the higher speed reduction ratio of the transmission mechanism; and
    the control portion controls the transmission mechanism based on a first shift control map which provides a reference for a shift between the lower speed reduction ratio and the higher speed reduction ratio of the transmission mechanism based on the speed of the hull and the rotational speed of the propeller.

2. The marine propulsion system according to claim 1, wherein the control portion controls the transmission mechanism to shift at least from the higher speed reduction ratio to the lower speed reduction ratio based on the speed of the hull and the rotational speed of the propeller.

3. The marine propulsion system according to claim 1, wherein
    the first shift control map includes a first range providing the lower speed reduction ratio, a second range providing the higher speed reduction ratio, and a third range provided at a boundary between the first range and the second range; and
    the control portion shifts to the lower speed reduction ratio when a locus on the first shift control map given by the speed of the hull and the rotational speed of the propeller enters the first range from the second range through the third range.

4. The marine propulsion system according to claim 3, wherein the control portion shifts to the higher speed reduction ratio when a locus on the first shift control map given by the speed of the hull and the rotational speed of the propeller enters the second range from the first range via the third range.

5. The marine propulsion system according to claim 3, wherein
- the third range of the first shift control map is provided in a band-shaped region arranged between both of a first referential curve provided on a side abutting the first range providing the lower speed reduction ratio and a second referential curve provided on a side abutting the second range providing the higher speed reduction ratio; and
- the control portion controls the transmission mechanism so that the transmission mechanism does not shift when the speed of the hull and the rotational speed of the propeller are positioned in the third range.

6. The marine propulsion system according to claim 1, wherein
- the first shift control map includes a first shift control map corresponding to an acceleration preferred mode and a first shift control map corresponding to a fuel efficiency preferred mode; and
- the control portion determines which mode is selected between the acceleration preferred mode and the fuel efficiency preferred mode based on an acceleration instruction provided by an operator, and to control the transmission mechanism based on the selected mode of the first shift control map.

7. The marine propulsion system according to claim 2, further comprising:
- an acceleration detection portion that detects an acceleration of the hull propelled by rotation of the propeller; wherein
- the control portion controls the transmission mechanism so that the transmission mechanism shifts from the higher speed reduction ratio to the lower speed reduction ratio based at least on the speed of the hull and the rotational speed of the propeller, and shifts from the lower speed reduction ratio to the higher speed reduction ratio based at least on the acceleration of the hull.

8. The marine propulsion system according to claim 7, wherein
- the control portion controls the transmission mechanism so that the transmission mechanism shifts from the lower speed reduction ratio to the higher speed reduction ratio based on a decreased amount of the acceleration of the hull after the acceleration of the hull starts decreasing from a maximum value.

9. The marine propulsion system according to claim 8, wherein the control portion controls the transmission mechanism so that the transmission mechanism shifts to the higher speed reduction ratio based on the first shift control map which provides a reference for a shift from the lower speed reduction ratio to the higher speed reduction ratio of the transmission mechanism based on the decreased amount of the acceleration of the hull and the rotational speed of the propeller.

10. The marine propulsion system according to claim 9, wherein
- the first shift control map includes a first range in which a shift is made from the lower speed reduction ratio to the higher speed reduction ratio; and
- the control portion controls the transmission mechanism so that the transmission mechanism shifts to the higher speed reduction ratio when a locus given by the decreased amount of the acceleration of the hull and the rotational speed of the propeller enters the first range on the first shift control map.

11. The marine propulsion system according to claim 9, wherein
- the first shift control map includes a first shift control map corresponding to an acceleration preferred mode and a first shift control map corresponding to a fuel efficiency preferred mode; and
- the control portion determines which mode is selected between the acceleration preferred mode and the fuel efficiency preferred mode based on an acceleration instruction from an operator and controls the transmission mechanism based on the first shift control map corresponding to the selected mode.

12. The marine propulsion system according to claim 1, further comprising:
- an acceleration detection portion that detects an acceleration of the hull propelled by a rotation of the propeller; wherein
- the control portion controls the transmission mechanism so that the transmission mechanism shifts from the higher speed reduction ratio to the lower speed reduction ratio based at least on the speed of the hull, and shifts from the lower speed reduction ratio to the higher speed reduction ratio based on the acceleration of the hull; and
- the control portion adjusts the first shift control map based on the speed of the hull and the rotational speed of the propeller at a time when a shift is made from the lower speed reduction ratio to the higher speed reduction ratio based on the acceleration of the hull.

* * * * *